US007650327B2

(12) United States Patent
Remsen et al.

(10) Patent No.: US 7,650,327 B2
(45) Date of Patent: Jan. 19, 2010

(54) MANAGING TAXONOMIC INFORMATION

(75) Inventors: David Pratt Remsen, Woods Hole, MA (US); Catherine N. Norton, Falmouth, MA (US)

(73) Assignee: Marine Biological Laboratory, Woods Hole, MA (US)

( * ) Notice: Subject to any disclaimer, the term of this patent is extended or adjusted under 35 U.S.C. 154(b) by 165 days.

(21) Appl. No.: 10/087,621

(22) Filed: Mar. 1, 2002

(65) Prior Publication Data

US 2003/0167283 A1      Sep. 4, 2003

(51) Int. Cl.
    *G06F 17/30*   (2006.01)
(52) U.S. Cl. .................. 707/3; 707/E17.099; 706/48
(58) Field of Classification Search ............. 707/3, 707/104.1, 100, 101, E17.099, E17.1; 706/20, 706/45–48
    See application file for complete search history.

(56) References Cited

U.S. PATENT DOCUMENTS

| | | | | |
|---|---|---|---|---|
| 5,978,804 | A * | 11/1999 | Dietzman ................ | 707/10 |
| 6,442,545 | B1 | 8/2002 | Feldman et al. ........... | 707/6 |
| 6,442,566 | B1 * | 8/2002 | Atman et al. ............ | 707/103 R |
| 6,542,902 | B2 * | 4/2003 | Dulong et al. ............ | 707/104.1 |
| 6,646,182 | B2 * | 11/2003 | Mahajan ................. | 800/278 |
| 6,665,681 | B1 * | 12/2003 | Vogel .................... | 707/101 |
| 6,675,159 | B1 | 1/2004 | Lin et al. ................ | 707/3 |
| 6,754,666 | B1 * | 6/2004 | Brookler et al. ........... | 707/102 |
| 6,763,349 | B1 * | 7/2004 | Sacco .................... | 707/3 |
| 6,789,091 | B2 * | 9/2004 | Gogolak ................. | 707/104.1 |
| 7,089,238 | B1 * | 8/2006 | Davis et al. .............. | 707/5 |
| 2001/0047353 | A1 * | 11/2001 | Talib et al. .............. | 707/3 |
| 2002/0087510 | A1 * | 7/2002 | Weinberg et al. .......... | 707/1 |
| 2002/0120618 | A1 | 8/2002 | Ushijima et al. ........... | 707/3 |
| 2002/0120631 | A1 * | 8/2002 | Conroy .................. | 707/104.1 |
| 2002/0194154 | A1 | 12/2002 | Levy et al. .............. | 707/1 |
| 2003/0041053 | A1 * | 2/2003 | Roth .................... | 707/3 |
| 2003/0088547 | A1 * | 5/2003 | Hammond ............... | 707/3 |
| 2003/0100475 | A1 * | 5/2003 | Pidgeon et al. ............ | 514/1 |
| 2004/0049510 | A1 * | 3/2004 | Minch et al. ............. | 707/100 |
| 2004/0103090 | A1 | 5/2004 | Dogi et al. .............. | 707/3 |
| 2007/0192287 | A1 * | 8/2007 | Rothwein et al. .......... | 707/3 |
| 2007/0198536 | A1 | 8/2007 | Coutts et al. ............. | 707/10 |

OTHER PUBLICATIONS

Cotter, "The National Biological Information Infrastructure: coming of age", Online Information Review v24n6 pp. 429-438 2000 ISSN: 1468-4527.*

Cotter et al., "The National Biological Information Infrastructure: coming of age", Online Information Review, vol. 24—No. 6, pp. 429-438, copyright MCB University Press, ISSN: 1468-4527 (2000).*

(Continued)

*Primary Examiner*—Leslie Wong
(74) *Attorney, Agent, or Firm*—Mintz, Levin, Cohn, Ferris, Glovsky and Popeo PC

(57) ABSTRACT

In a management of taxonomic information, a name that specifies an organism is identified. Based on the name and a database of organism names or classifications, another name that specifies the organism and that represents a link between pieces of biological identification information in the database, or a classification for the organism, is determined. Based on the other name or the classification, information associated with the organism is identified.

32 Claims, 41 Drawing Sheets

OTHER PUBLICATIONS

Martin R. Pullan et al., "The Prometheus Taxonomic Model: a practical approach to representing multiple classifications", Taxon 49: 55-75, 2000, ISSN 0040-0262).*

Gladys Cotter, et al., "The National Biological Information Infrastructure: coming of age", Online Information Review, vol. 24—No. 6, pp. 429-438, copyright MCB University Press—ISSN 1468-1527 (2000).

Martin R. Pullen, et al. (2000). "The Prometheus Taxonomic Model: a practical approach to representing multiple classifications."—Taxon 49: 55-75. —ISSN 0040-0262.

* cited by examiner

Scientific names for the bluefish, *Pomatomus saltator*
Cheilodipterus heptacanthus
Cheilodipterus saltatrix
Chromis epicurorum
Gasterosteus saltatrix
Gonenion serra
Lopharis mediterraneus
Perca lophar
Pomatomus pedica
Pomatomus saltator
Pomatomus saltatrix
Pomatomus skib
Scomer sypterus
Sparactodon nalnal
Sypterus pallasii
Temnodon conidens
Temnodon saltator
Temnodon tubulus Other names
Bluefish (FAO/English)
Tassergal (FAO/French)
Anjova (FAO/Spanish)
Sinikala (Finnish)
Blaufisch (German)
Gofári (Greek)
Pesce serra (Italian)
Amikiri (Japanese)
Anchova (Portuguese)
Plitica (Serbo-Croat)
Strijelka skakusa (Serbo-Croat)
Lüfer (Turkish)
Blue-fish (English)
Anchova (Portuguese)
Bluefish (AFS/English)
Shad (English)
Elf (English)
Tekwaya (Arabic)
Tekwa (Arabic)
Tasergal (Polish)
Teleskopabborre (Swedish)
Dyphavsabbor (Norwegian)
Enchova (Portuguese)
Tailor (English)
Skipjack (English)
Anchova de banco (Spanish)
Elwe (Afrikaans)

FIG. 16

| Function name | What it does |
|---|---|
| classifications(); | returns the canonical list of classifications from the name server |
| me($myID,$d,$type,$l) | returns the name of entity myID according to the type attribute provided |
| name_types($d); | returns a $d delimited array of n ame types such as "English,French,ICZN-Current, Synonym, Misspelling, etc. |
| chroot($myID, $classification) | sets the name server root of the application to $myID. Sets parent of myID to zero. Allows developers of taxa specific applications to only use relevant parts of the classification |
| names($myID,$d, $order,$l) | returns an ary delimited by string, $d |
| children($myID,$d, $classifcation,$type, $order,$l) | returns an array of the children on $myID according to the classification $classification. Other options include the name type to return, sort order, etc. |
| parent($myID,$d, $classifcation,$type, $order,$l) | Ancestry of $myID with many output options |
| list_my_children ($myID) | A recursive function for dumping tree information. |
| get_name($myID, $name_type, $date,ref) | Return a specific name for a taxa such as the French form or the currently accepted name or a junior synonym. |
| classify($myID, $classification, $length) | Returns an array of ancestry for a given classification to a given number of steps relative to the taxa. A length of 0 returns to the tree root. |
| names($myID, $fields) | Returns an array of all names for a given taxonomic entity. Fields returned in the array can be specified. |
| dump($myID, $delimiter,$fields, $classification) | Dumps from myID down in spreadsheet form |
| pad($myID,$s, $class,$root) - | Delimiters used to pad the taxonomic level type. Ex (pad (AR201,"=-","1C",5) outputs "=-=-=-=-=-=-" because according to classification "1C" this entity (a genus) would be indented six places to correspond to the six levels from the starting point of level "5" (corresponding to "Phylum") from the root of classification 1C. |

FIG. 19

Marine Biological Laboratory

MBL HOME    directory    site map    search

Marine Animals at the MBL

[ Find ]

- Metazoa ->>
  - Annelida Segmented Worms
  - Arthropoda Joint-legged animals
  - Bryozoa Moss Animals
  - Chaetognatha Arrow Worms
  - Chordata Vertebrates and allies
  - Cnidaria Coelenterates
  - Ctenophora Comb Jellies
  - Echinodermata Spiny-skinned Animals
  - Hemichordata Acorn Worms
  - Mollusca Mollusks
  - Nemertea Ribbon Worms
  - Platyhelminthes Flatworms
  - Porifera Sponges
  - Sipuncula Peanut Worms This database represents approximately 200 species of marine organisms available in our Marine Resources Center and collected by the Aquatic Resources Division. Most of these organisms are available for purchase by qualified educational institutions and researchers.

Expand from Metazoa down. (560 taxa)

This program uses the Taxonomic Name Server for name authority information.

Server numbers

Click on grouping at left for a listing of species

Taxonomy Data Browser v0.9

Back  View

Data Server: zeus.mbl.edu

☐ SuperClass Pisces
☐ Class Actinopterygii
☐ Order Tetraodontiformes
☐ Family Tetraodontidae
☐ Genus Sphoeroides Sphoeroides testudineus
Fugu
Checkered puffer
Crepaud de mer
Sphoeroides testudineus
Tetraodon testudineus
Tetrodon punctatus
Tetrodon punctatis ▽ Books
▷ Citations
▷ Classifications
▷ Collections
▽ Identification
  ▽ Keys
    ▷ Regional
    ▷ Systematic
▷ Images
▷ Location ▽ Systematic Key to the Tetraodontidae
   www.museo.ja/fish/key - LucID Key
   Author: DP Remsen, 2001
   + matrix_id_200.1 "teeth bicuspidate.."
   <6> images available <view thumbnail>
   <import><link>

△ Key to the Common Fish of Jamaica
   Hofstra Univ. Field Station

△ Fishes of the Caribbean
   University of California - Davis

△ The Voyage of H.M.S. Challenger...
   MBL/WHOI Library

SUMMARY OF RESULTS

*Cythere crispata*, Brady.  Obtained also at Station 187 and Port Jackson.
" *cymba*, Brady.  Obtained also at Station 233B, 15 fathoms.Recorded from Hong Kong.
" *goujoni*, Brady.  Obtained also at Station 187 and Port Jackson.
" *darwini*, Brady  Obtained also at Station 233B, 15 fathoms.Recorded from Java
" *cribriformis*, Brady  Obtained at no other locality by the Challenger.
*Loxoconcha sinensis*, Brady  Obtained also at Station 233B, 15 fathoms. Recorded from Hong Kong.
*Bythocythere orientalis*, Brady  Obtained also in Torres Strait.
*Cytherella cingulata*, Brady  Obtained also at Stations 187, 189, and Port Jackson MACRUHA (Spence Bate, Zool. pt 52).
  *Alpheus rupax*, Fabricius.  One specimen (10 fathoms): obtained at no other locality by the Challenger.
*Nauticaris unirecedens*, n.g., n.sp. One specimen; obtained at no other locality.

ANOMURA (Henderson, Zool. pt. 69)
  *Spiropagurus spiriger* (De Haan), One spicemen in the shell of *Pleurotoma* (10 fathoms); for distribution see Torres Strait.
  *Porcellana serratifrons*, Stimson. One specimen (10 fathoms); obtained also in Arafura Sea.
  *Rephidopus ciliatus*, Stimpson.  One specimen (10 fathoms); obtained at no other locality by the Challenger. Recorded from Hong Kong.

BRACHYCRA (Miers, Zool. pt. 49)
  *Neptunas (Amphitrite) hastatoides* (Fabricius). Several Specimens (10 fathoms); obtained also at Stations 188, 233B, and Japan.
  *Goniosoma cruciferum* (Fabricius). One specimen (7 fathoms); obtained at no other locality by the Challenger.
  *Arcunia septemspinosa* (Fabricius). Three specimens (10 fathoms) obtained also at Station 233B, 16 fathoms, and Japan.
  *Leucosia craniolaris* (Linué).  Two specimens (10 fathoms); obtained also at Stations 188, 190, and Japan.
  *Dorippe facchino* (Herbst).  One specimen (10 fathoms); obtained at no other locality by the Challenger.

GASTEROPODA (Watson, Zool. pt. 42).
  *Pleurotoma (Surcula) tuberculata*, Gray.  (10 fathoms); obtained also in Arafura Sea.

FIG. 22

| ing in- | June, whereas the contain only smaller |
| imals; | eggs after the early part of July, No |
| inating | individual, however, is actually known to |
| marine | have given birth to two broods in a single |
| nohs of | summer. |
| d by a | |
| reeding | The sand shark, *Carcharias Littoralis*, the |
| ture of | most common shark at Woods Hole during |
| growth | the summer, so far as I know, has never |
| | been taken during the breeding season |
| | all the individuals being apparently imma |

FIG. 23

The Bluefish, Pomatomus saltator

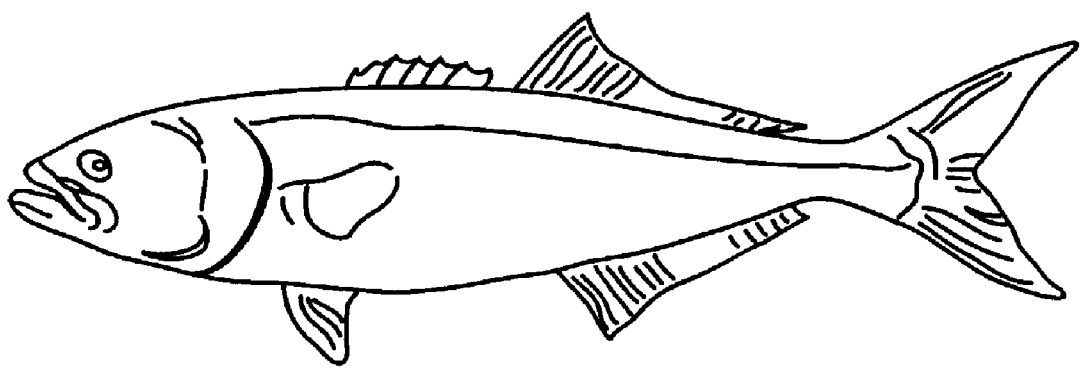

FIG. 24

FIG. 26 www.fishbase.org

Common Names of *Pomatomus saltator*

| | |
|---|---|
| | Bluefish (E) |
| | Pomatomus saltator (LVN) |
| | Cheilodipterus heptacanthus (Syn) |
| | Cheilodipterus saltatrix (Syn) |
| | Chromis epicurorum (Syn) |
| | Gasterosteus saltatrix (Syn) |
| | Gonenion serra (Syn) |
| | pharis mediterraneus (Syn) |
| | Perca lophar (Syn) |
| | Pomatomus pedica (Syn) |
| | Pomatomus saltatrix (Syn) |
| omus skib | (Syn) |
| r sypterus | (Syn) |
| don nalnal | (Syn) |
| us pallasii | (Syn) |
| conidens | (Syn) |
| on saltator | (Syn) |
| on tubulus | (Syn) |
| Chopper | (E) |
| Tailor | (E) |
| napper Blue | (E) |
| Amikiri | (Jap) |
| Ach'ked | (Arab) |
| Anchova | (Port) |
| a de banco | (Sp) |
| Anjova | (Sp) |
| Blaufisch | (Ger) |
| Blue-fish | (E) |
| havsabbor | (Nor) |
| Elf | (E) |
| Elwe | (Afri) |
| Enchova | (Port) |
| Gófari | (Gree) |
| Lüfer | (Turk) |

Synomyms of *Pomatomus saltator*

| Synonym | Author | Status |
|---|---|---|
| Pomatomsus saltator | (Lumaeus, 1766) | misspelling |
| Gasterosleus saltator | (Lumaeus, 1766) | original combination |
| Pomatomues saltator | (Lumaeus, 1766) | new combination |
| Teminadors saltator | (Lumaeus, 1766) | new combination |
| Ckestadipterics saltator | (Lumaeus, 1766) | new combination |
| Ferca lophas | Formold, 1775 | junior synonym |
| Ckestadipterics heptocaritkins | Lacepede, 1801 | junior synonym |
| Pomatomues sitrub | Lacepede, 1802 | junior synonym |
| Lapharis mechterranens | Rafresque, 1810 | junior synonym |
| Gamerison sema | Rafresque, 1810 | junior synonym |
| Scamer rypterus | Pallas, 1814 | junior synonym |
| Sypterus pallaris | Eschwalds, 1831 | junior synonym |
| Chronmis spiereroroum | Crinmew, 1864 | junior synonym |
| Teminadors coniderus | Ceeselnau, 1861 | junior synonym |
| Speractodon nalnal | Rochebrune, 1880 | junior synonym |
| Teminadors tubvulus | Saville Kent, 1893 | other |

Pesce s
Plitica (
Shad (E
Sinikala
Skipjack
Strijelka skakus
Tasergal (Poli)
Pomatomus sa
Tassergak (Fr)
Tekwa (Arab)
Tekwaya (Arab
Teleskopabborre (Sw)

Classification: ICLARM:FishBase

...SuperClass Pisces
......Class Actinopterygii
.........Order Perciformes
............Family Pomatomidae
..............Genus Pomatomus
................Binomen Pomatomus saltator

Names:
    Bluefish (E)
    Pomatomus saltator (LVN)
    Cheilodipterus heptacanthus (Syn)
    Cheilodipterus saltatrix (Syn)
    Cromis epicurorum (Syn)
    Gasterosteus saltatrix (Syn)

Links: *Pomatomus saltator*

MBL
Database of Marine Organisms
The Flescher Slides Collection
The Biological Bulletin Citations Datbase
MRC Catalog of Specimens
Compendium of Eggs and Embryoes
The Teaching Charts of Rudolph Leuckar

FIG. 30

Classification: ICLARM:FishBase

.....SuperClass Pisces
......Class Actinopterygii
........Order Clupeiformes
..........Family Cluepeidae
............Genus Brevoortia
..............Binomen Brevoortia tyrannus

Names:
Atlantic menhaden (E)
Brevoortia tyrannus (L)
Clupea carolinensis (Syn)
Clupea menhaden (Syn)
Clupea neglecta (Syn)
Clupea tyrannus (Syn)

Links: *Brevoortia tyrannus*

MBL
Database of Marine Organisms
The Flescher Slides Collection
The Biological Bulletin Citations Datbase
MRC Catalog of Specimens
Compendium of Eggs and Embryoes
The Teaching Charts of Rudolph Leucka?
Woods Hole Oceanographic Institution
Discovery: The Salt Marsh
Mariner Library Catalog
Oceanus Magazine: Oct 1983 Issue
JASON Project, 1997 Fisheries Worldw?
Laboratory of Dr. Peter Cummins

SUMMARY OF RESULTS 347

FISHES (Günther, Zool. pt. 47).
*Ipnaps murrangi*, n.g., n.s.p.   Two specimens; obtained also at Stations 124 and 198. Only species of the genus.

Ipnops murrayi
Ipnops pristibrachium
Ipnops agassizii
Ipnoceps pristibrachium

Split in 1927 into
 Ipnops murrayi
 Ipnops pristibrachium

FIG. 35

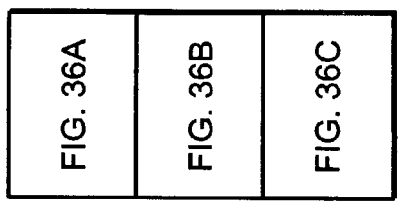

FIG. 36

| FIG. 36A |
| FIG. 36B |
| FIG. 36C | dTNS (distributed Taxonomic Name Server)

Documentation
Jump to: Vertebrates/Fish
/Mammals/Birds/Reptiles

Server        Name
Numbers    [        ]   [Find]

... Organisms (C1)
...... Eukaryote (P1)
........2 Opisthokonts (P2673)
........3 Choanoflagellates And Animals (P2674)
......... Metazoa (D1)
.......... Chordata (D1537)
........... Vertebrata (D1543)
............ Gnathostomata (D1547)
............. Osteichthyes (D1555)
......Class Actinopterygii (F192005)
......Order Perciformes (F180037)
............Family Pomatomidae (F175393)
...............Genus Pomatomus (F103337)
.........Binomen Pomatomus saltator Entrez (F364) 0

Names:
Bluefish (E)
Pomatomus saltator (L)
Cheilodipterus heptacanthus (Syn)

FIG. 36A

Cheilodipterus saltatrix (Syn)
Chromis epicurorum (Syn)
Gasterosteus saltatrix (Syn)
Gonenion serra (Syn)
Lopharis mediterraneus (Syn)
Perca lophar (Syn)
Pomatomus pedica (Syn)
Pomatomus saltatrix (Syn)
Pomatomus skib (Syn)
Scomer sypterus (Syn)
Sparactodon nalnal (Syn)
Sypterus pallasii (Syn)
Temnodon conidens (Syn)
Temnodon saltator (Syn)
Temnodon tubulus (Syn)
Chopper (E)
Tailor (E)
Snapper Blue (E)
Tassergal (FR)
Anjova (Sp)
Sinikala (Fi)
Blaufisch (Gr)
Gofári (Gk)
Pesce serra (It)
Amikiri (Jp)
Anchova (Pr)

FIG. 36B

Plitica (SC)
Strijelka skakusa (Serb)
Lüfer (Tk)
Blue-fish (E)
Anchova (Pr)
Shad (E)
Elf (E)
Tekwaya (Ar)
Tekwa (Ar)
Tasergal (Po)
Teleskopabborre (Sw)
Dyphavsabbor (No)
Enchova (Pr)
Skipjack (E)
Anchova de banco (Sp)
Elwe (Af)

Data Views: Dump  Level: species ▶  SQL outputs: parent/child & columns :
explode                                 Pending
         Delimiter:

FIG. 36C

| Various output formats served by the Name Server layer via a Taxonomic Name Server | | | |
|---|---|---|---|
| A table of all names and their qualifiers | A string containing the preferred name | A table with a specified list of taxa levels and the preferred name | The full ICZN classification with "##" as a delimiter |
| tns -nq "Name/Qualifier" -t -name "Pomatomus saltatrix" | tns -pv -name "Pomatomus saltatrix" -s | tns -c,pv,l "Kingdom,Phylum,Class,Order,Family,Genus,Species" -name "Pomatomus saltatrix" | tns -c,pv,a -name "Pomatomus saltatrix" -l -t## |
| Name           Qualifier | Pomatomus saltator | Kingdom    Eukaryota | EUKARYOTES##Living_Organisms Kingdom## |
| Bluefish       (E) | | Phylum     Chordata | SubKingdom##OPISTHOKONTS ParvPhylum##Metazoa |
| Pomatomus saltator (L) | | Class      Actinopterygii | Phylum##Chordata Subphylum ##Vertebrata |
| Cheilodipterus heptacanthus (Syn) | | Order      Perciformes | Superclass## Gnathostomata Class##Osteichthyes |
| Cheilodipterus saltatrix (Syn) | | Family     Pomatomidae | subClass##Actinopterygii SuperClass##Pisces |
| Chromis epicurorum (Syn) | | Genus      Pomatomus | Class##Actinopterygii Order##Perciformes |

FIG. 37A

| Various output formats served by the Name Server layer via a Taxonomic Name Server | | | |
|---|---|---|---|
| Gasterosteus saltatrix | (Syn) | Species saltator | Family##Pomatomidae Genus##Pomatomus Species##saltator |
| Gonenion serra | (Syn) | or the same table with common English names | |
| | | tns -c,ce,l "Kingdom,Phylum,Class,Order,Family,Genus,Species" -name "Pomatomus saltatrix" -t: | |
| Lopharis mediterraneus | (Syn) | Kingdom: EUKARYOTES | |
| Perca lophar | (Syn) | Phylum: Animals with Backbones | |
| Pomatomus pedica | (Syn) | Class: Ray-finned Fish | |
| Pomatomus saltatrix | (Syn) | Order: Perches and Allies | |
| Pomatomus skib | (Syn) | Family: Bluefish Family | |
| Scomer sypterus | (Syn) | Genus: Bluefish | |
| Sparactodon nalnal | (Syn) | Species: Bluefish | |
| Sypterus pallasii | (Syn) | | |

FIG. 37B

| Various output formats served by the Name Server layer via a Taxonomic Name Server | | | |
|---|---|---|---|
| Temnodon conidens (Syn)<br>Temnodon saltator (Syn)<br>Temnodon tubulus (Syn)<br>Chopper (E)<br>Tailor (E)<br>Snapper Blue (E) | | | |

FIG. 37C

MANAGING TAXONOMIC INFORMATION

BACKGROUND

This invention relates to managing taxonomic information.

With modern advances in computer technology and network and Internet technologies, vast amounts of information have become readily available in homes, businesses, and educational and government institutions throughout the world. Indeed, many businesses, individuals, and institutions rely on computer-accessible information on a daily basis. This global popularity has further increased the demand for even greater amounts of computer-accessible information. However, as the total amount of accessible information increases, the ability to locate specific items of information within the totality becomes increasingly more difficult.

The format with which the accessible information is arranged also affects the level of difficulty in locating specific items of information within the totality. For example, searching through vast amounts of information arranged in a free-form format can be substantially more difficult and time consuming than searching through information arranged in a pre-defined order, such as by topic, date, category, or the like. Due to the nature of certain on-line systems much of the accessible information is placed on-line in the form of free-format text. Moreover, the amount of on-line data in the form of free-format text continues to grow very rapidly.

Search schemes employed to locate specific items of information among the on-line information content typically depend upon the presence or absence of key words (words included in the user-entered query) in the searchable text. Such search schemes identify those textual information items that include (or omit) the key words. However, in systems, such as the World Wide Web ("Web"), or large Intranets, where the total information content is relatively large and free-form, key word searching can be problematic, for example, resulting in the identification of numerous text items that contain (or omit) the selected key words, but which are not relevant to the actual subject matter to which the user intended to direct the search.

As text repositories grow in number and size and global connectivity improves, there is a need to support efficient and effective information retrieval (IR), searching, and filtering. A manifestation of this need is the proliferation of commercial text search engines that crawl and index the Web, and subscription-based information mechanisms.

Common practices for managing such information complexity on the Internet or in database structures typically involve tree-structured hierarchical indices such as the Internet directory Yahoo!™, which is largely manually organized in preset hierarchies. Patent databases are organized by the U.S. patent office's class codes, which form a preset hierarchy. Digital libraries that mimic hardcopy libraries support subject indexing inspired by the Library of Congress Catalogue, which is also hierarchical.

Querying or filtering by key words alone can produce unsatisfactory results, since there may be many aspects to, and often different interpretations of, the key words, and many of these aspects and interpretations may be irrelevant to the subject matter that the searcher intended to find.

For example, if a wildlife researcher is attempting to find information about the running speed of the jaguar by submitting the query "jaguar speed" to an Internet search engine, a variety of responses may be generated, including responses relating to Jaguar® cars and a Jaguar sports team, as well as responses relating to the jaguar animal.

If an index such as Yahoo!™ is used, the user can seek documents containing "jaguar" in the topical context of animals. It is labor- and time-intensive to maintain such an index as the Web changes and grows.

Biocentric information is information associated with at least one instance of something that is or was alive ("biotic entity" or "organism"), and, as illustrated in FIGS. 1-2, may include human observations recorded to physical media, physical specimens, and other biocentric data items that libraries store and that museums collect, including photographs, slides, and annotations on physical specimens. Libraries house vast collections of publications, many of which refer to the observations and recordings about the natural world (see, e.g., FIG. 3).

As shown by example in FIG. 4, biocentric data items can be electronic objects that represent biocentric information in an electronically accessible way. Biocentric data items can be derived from biocentric information in a variety of formats.

Biocentric files may be served through applications, as illustrated by examples in FIG. 5. Observations may be recorded in tables that are served via database management tools. A suite of software tools may allow table data to be flexibly delivered to the Web. Accordingly, information on specimen collections, bibliographic references, and field observations of organisms can be recorded and retrieved.

Multimedia objects having audio, illustrations, photographs, or video (sometimes referred to as "binary large objects" or "BLOBs") may be served by many applications. FIG. 6 illustrates an example of a combination of database and image server used to serve photos to the Web. The images are served through the image data server, which communicates with the database server to locate and serve the associated text annotations.

Full-text documents represent a resource of biocentric information. Books, journals, monographs, and manuscripts are historic means of communicating and storing knowledge of the natural world. The recording, parsing, and serving of full-text is a complicated endeavor. Technologies known as Standard Generalized Markup Language (SGML) and Extensible Markup Language (XML) offer a flexible infrastructure for serving full-text data, as diagrammed in FIG. 7.

Applications reside on host computers that serve that biocentric data through network protocols. Often these hosts are specialized for a particular task or group of tasks, as illustrated by examples in FIG. 8. One server may supply many different services or the services may reside on more than one machine. The information that is served may reside at a particular location to take advantage of services on the host or proximity to a data manager to facilitate management.

Multiple hosts can be organized within logical subnetworks that can be viewed as a logical entity known as a domain, as shown by example in FIG. 9. A domain may represent a collection of hosts, each with its own collection of applications, each with its own collection of biocentric data.

FIG. 10 illustrates by example that relationships exist between domains and applications within domains concerning the biocentric data. A domain is a user-defined arbitrary collection of applications. For example, an institution may have a library catalog application and an on-line encyclopedia application, both of which rely on animal names.

Scientific interest in the creation of a unified catalog of the 1.75 million known species of living organisms has been recognized by Species 2000 and North America's Integrated Taxonomic Information Systems (ITIS).

Such an attempt to organize biocentric information is put forth in the context of the large number of species, the variation within species, and the expression of individual and species information with historical and geographical dimensions, from scales ranging from the molecular to the ecosystem, and modified as a function of a myriad of potential biotic and abiotic interactions. Furthermore, much of the known information was collected in a pre-electronic format, and the ranks of the custodians of much of that information (primarily taxonomists) are not being fully replenished as the custodians retire. Bioinformatics tools such as GenBank® are available to deal with molecular data. However, data on biodiversity can be difficult to assemble. The challenge of making biodiversity information available electronically is of such a magnitude that it has been described as requiring a "mega science" response. Federal and intergovernmental programs such as Global Biodiversity Information Facility (GBIF), Partnerships for Enhancing Expertise in Taxonomy (PEET), Australian Biological Resources Study (ABRS), and Species 2000 have emerged to address this problem. One strategy is based on assembling large databases.

Facilities that have been proposed include the following. A GBIF connects smaller databases and creates a directory of the three billion specimens in museums and seed banks. GBIF is an initiative of the United Nations Environment Programme/Organization for Economic Cooperation and Development (UNEP/OECD) and inter-governmental programs committed to documenting the diversity of life. GBIF includes Species 2000 and the Expert Taxonomy Institute (ETI) as associates.

Species Analyst is a biodiversity site that provides access to natural-history databases to promote taxonomy in the United States. Species Analyst seeks to integrate biodiversity information through the Web.

Species 2000, which aims to index all the world's known species, has data on 250,000 species in a rigid database structure. Species 2000 is a focal point for many biodiversity enterprises.

Deep Green presents data on the genetics and evolution of plants.

SUMMARY OF THE INVENTION

In a management of taxonomic information, a name that specifies an organism (i.e., at least one organism) is identified. Based on the name and a database of organism names or classifications, another name that specifies the organism and that represents a link between pieces of biological identification information in the database, or a classification for the organism, is determined. Based on the other name or the classification, information associated with the organism is identified.

In another aspect of the invention, in a management of taxonomic information, a first name that specifies an organism (i.e., at least one organism) is identified. Based on the first name and a database of organism names or classifications, a second name that specifies the organism or a classification for the organism is determined. Revised search parameters are derived from the second name or the classification and original search parameters based on the first name. The revised search parameters may correspond to a different search scope (e.g., a narrower search scope or a wider search scope) than the original search parameters.

Implementations of the invention may provide one or more of the following advantages. A universal organism name resolution and classification system can be provided. The integrative power of names can be made available through the Internet. Tools can be provided to link biological data, including current and old data, across the Internet. Information that pertains to an organism can be located without prior knowledge of the organism name used by the information. Information pertaining to organism relatives of a subject organism can be located without prior knowledge of the subject organism's relationship in a system of classification of organisms. A knowledge base of name information for a subset of organisms can be made available together with another knowledge base of name information for another subset of organisms. The benefit of expert knowledge in naming conventions for a subset of organisms can be made available for automatic application in searches for information that pertains to the subset. Information that is linked by organism context and that is lacking in name identity can be managed and treated as a single body of information. A central clearinghouse can be provided for name and classification resolution that is not dependent on a single central comprehensive authority on naming and classification conventions. Specialized expertise in name and classification conventions can be integrated in a general purpose name and classification resolution system. The quality of search results produced from existing databases of organism information can be improved with little or no change to the databases or basic search methods. The quality and clarity of reports can be improved by automated application of expert or widely accepted standards in naming and classification conventions. Information that pertains to the same organism or related organisms and that is recorded or referenced in different languages (e.g., English and French) can be treated as part of a single body of knowledge. Lay persons, students, and knowledgeable researchers can explore a database of organism information in accordance with an organism classification scheme regardless of whether the database is organized in accordance with the scheme.

Other advantages and features will become apparent from the following description, including the drawings, and from the claims.

BRIEF DESCRIPTION OF THE DRAWINGS

FIGS. 11, 22-24, and 35 are illustrations of possible example subjects of a taxonomic information system.

FIGS. 12, 16, 19, 29-33, and 37A-37C are illustrations of example data possibly for use in a taxonomic information system.

FIGS. 20-21, 25-28, 34, 36A-36C are illustrations of possible example output of a taxonomic information system.

DETAILED DESCRIPTION

Names often serve as the universal common denominators for biological information. Any given organism or group of organisms may have many different scientific and vernacular names associated with it, i.e., may have names that are synonyms, and any one of these synonyms may be linked to a specific piece of information.

In the case of any particular organism or group of organisms, relevant data may reside within the services of multiple applications, on multiple hosts, within multiple domains on the network. A taxonomic information system described below facilitates locating the relevant data. The capabilities of the system are based on the nature of the mechanisms that have been used to record the names and the groups of organisms.

Figure 1:
FIGS. 1-10 are illustrations of prior art taxonomic information.
Figure 2:
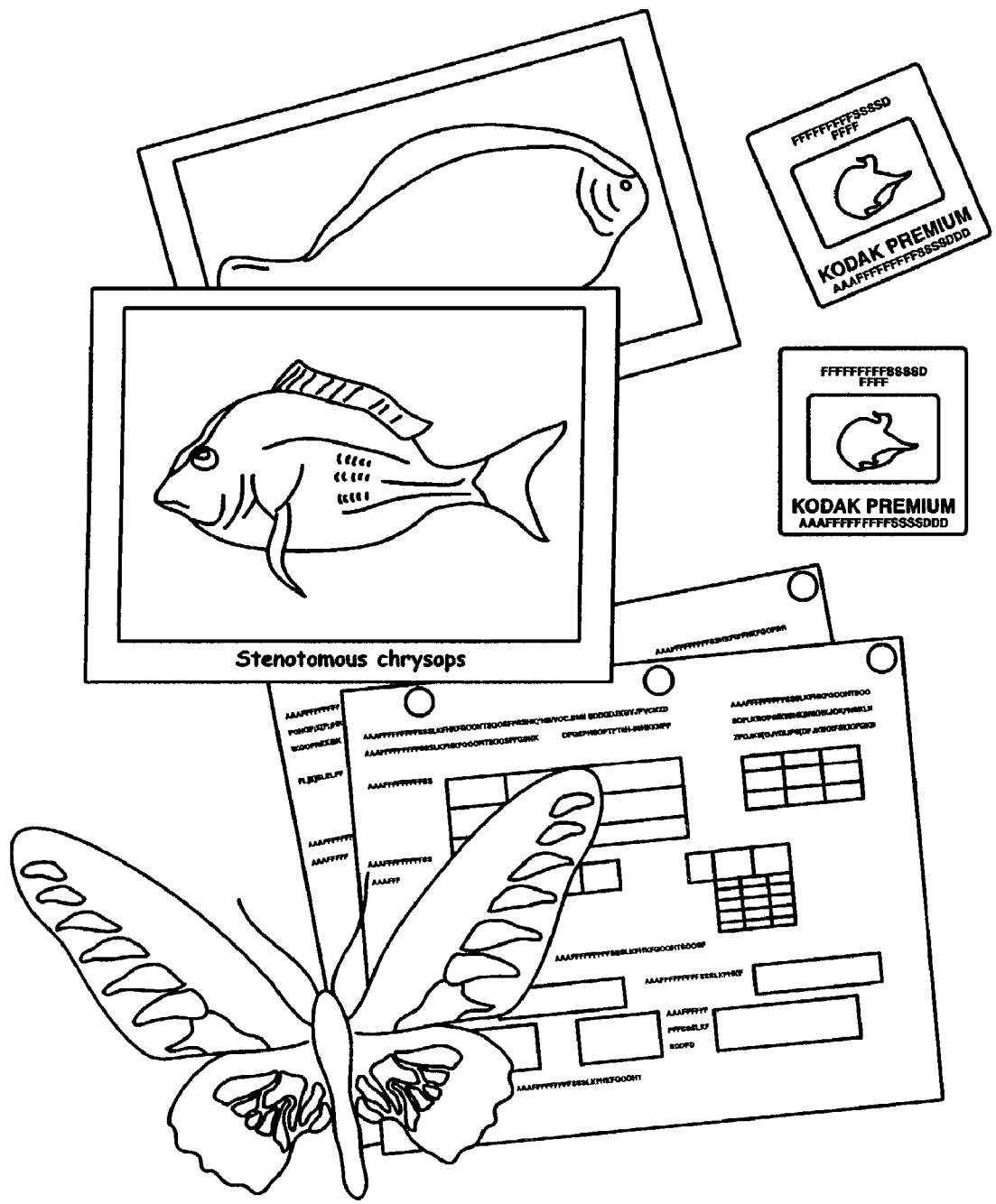
Figure 3:
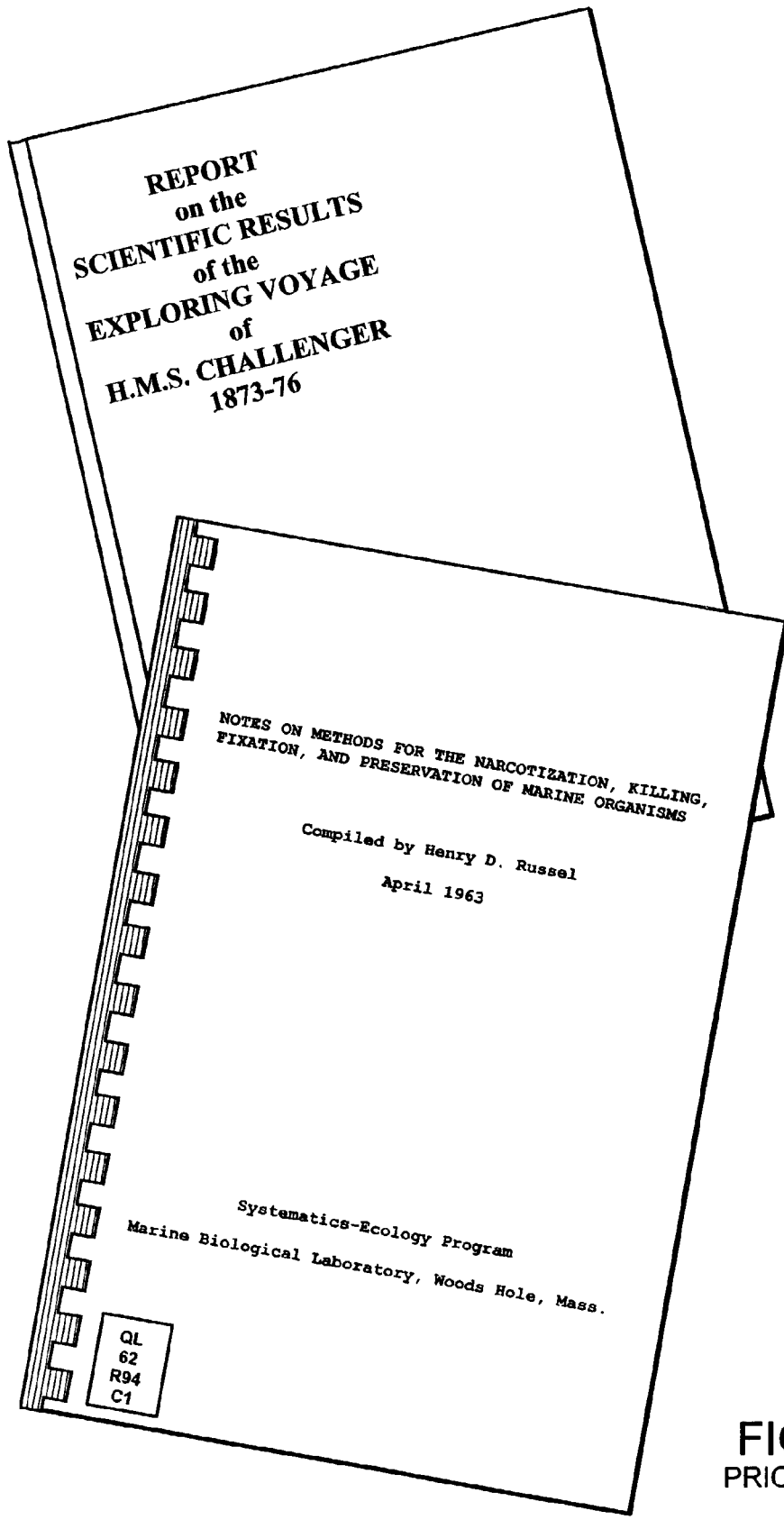
Figure 4:
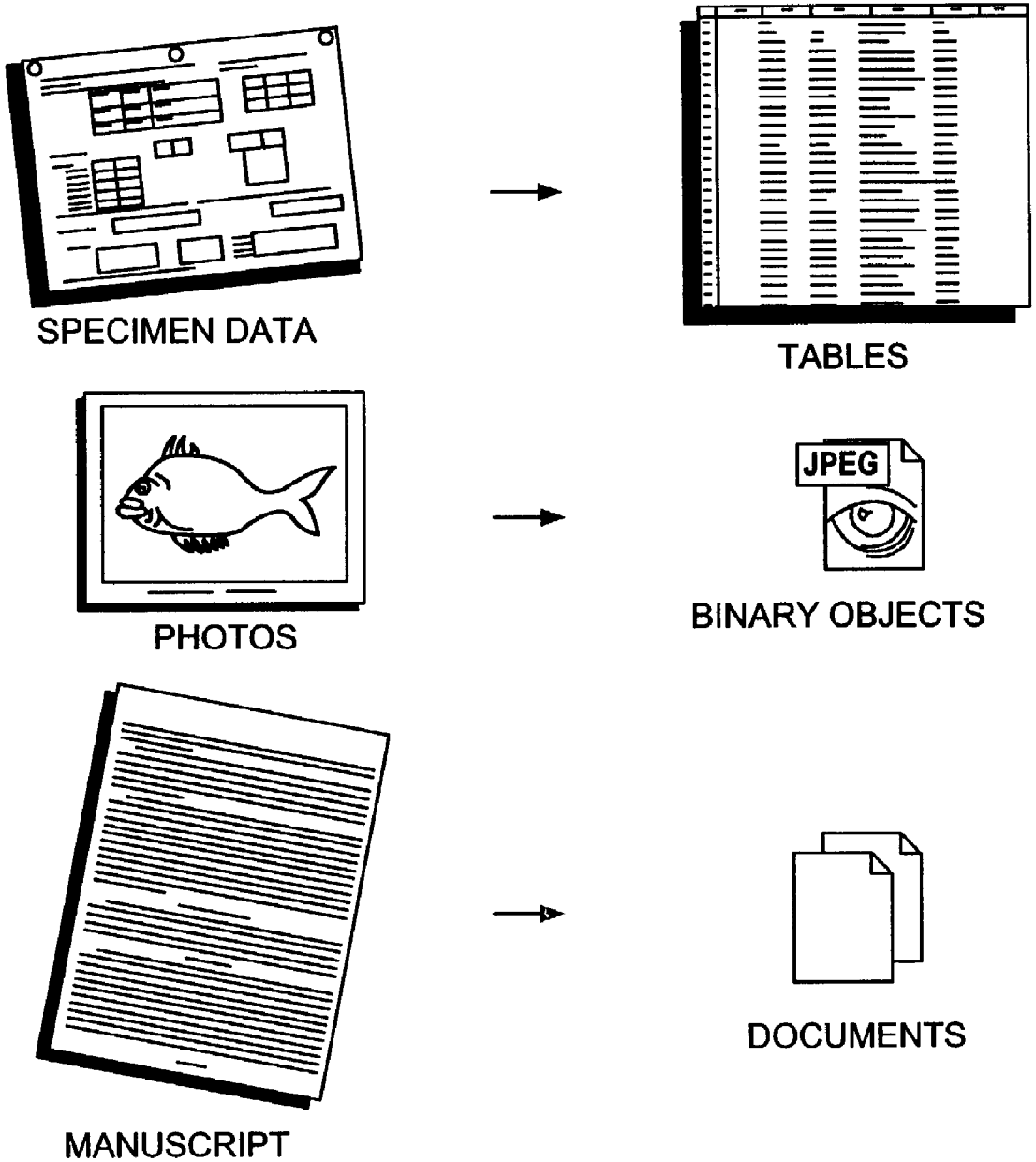
Figure 5:
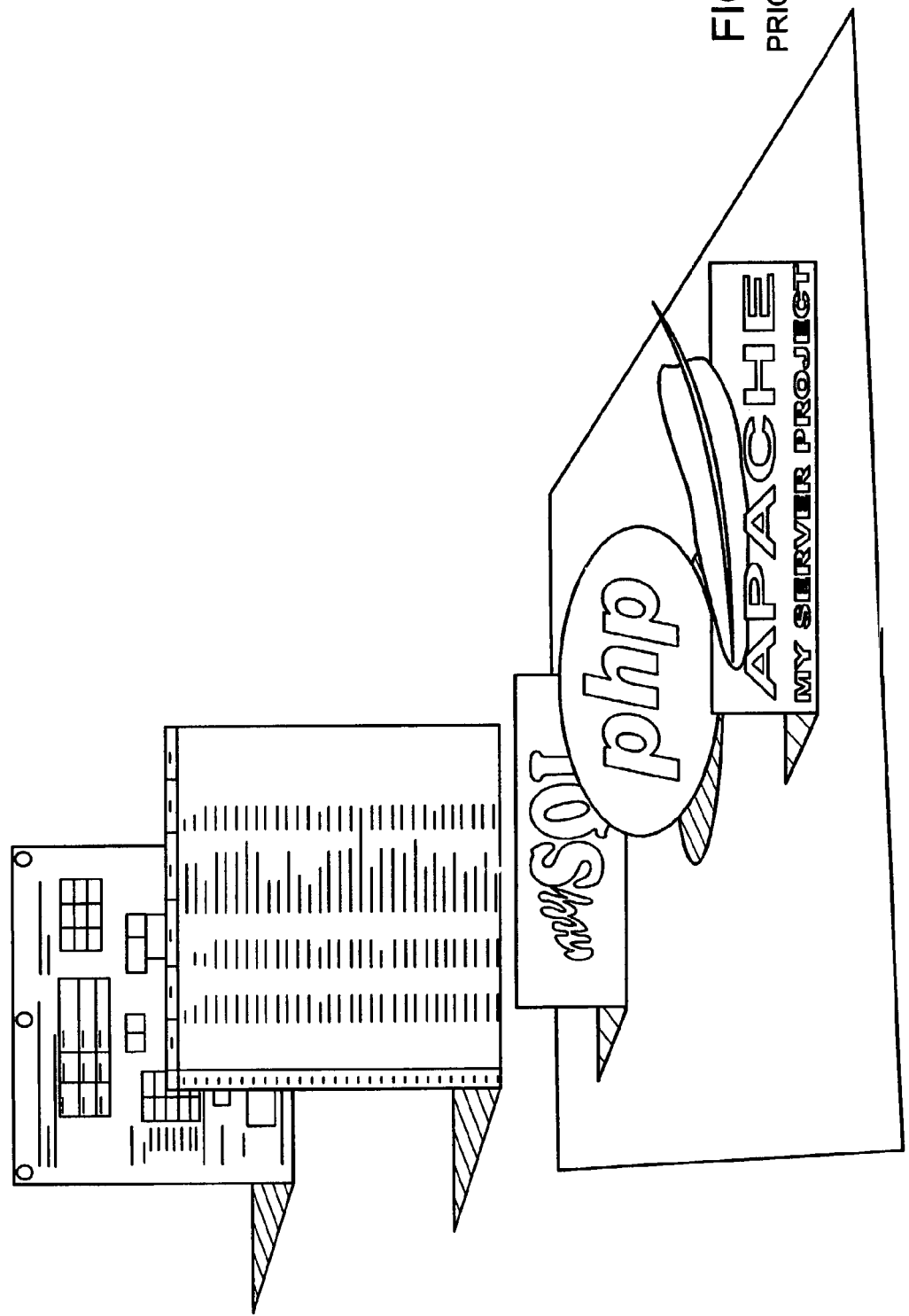
Figure 6:
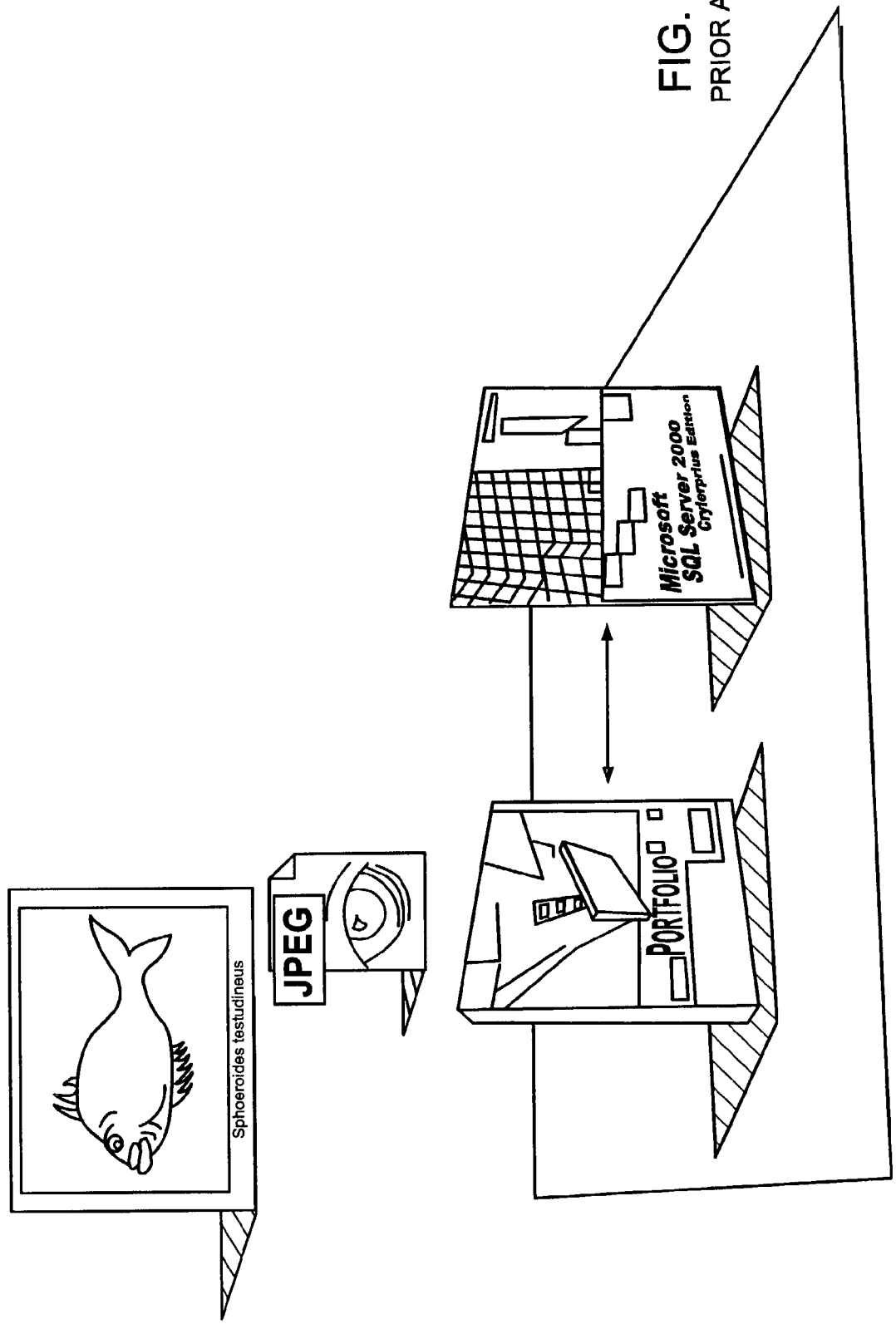
Figure 7:
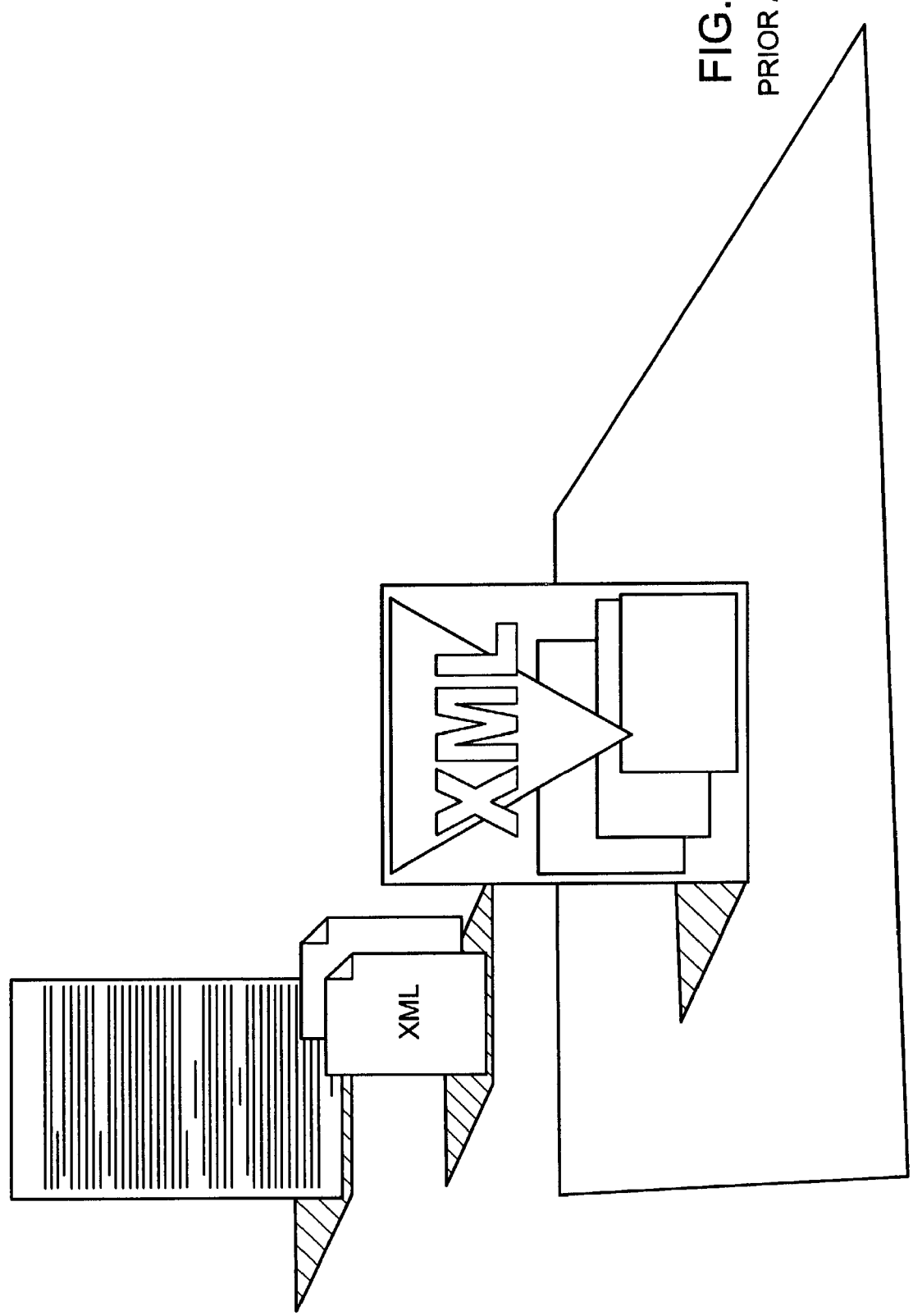
Figure 8:
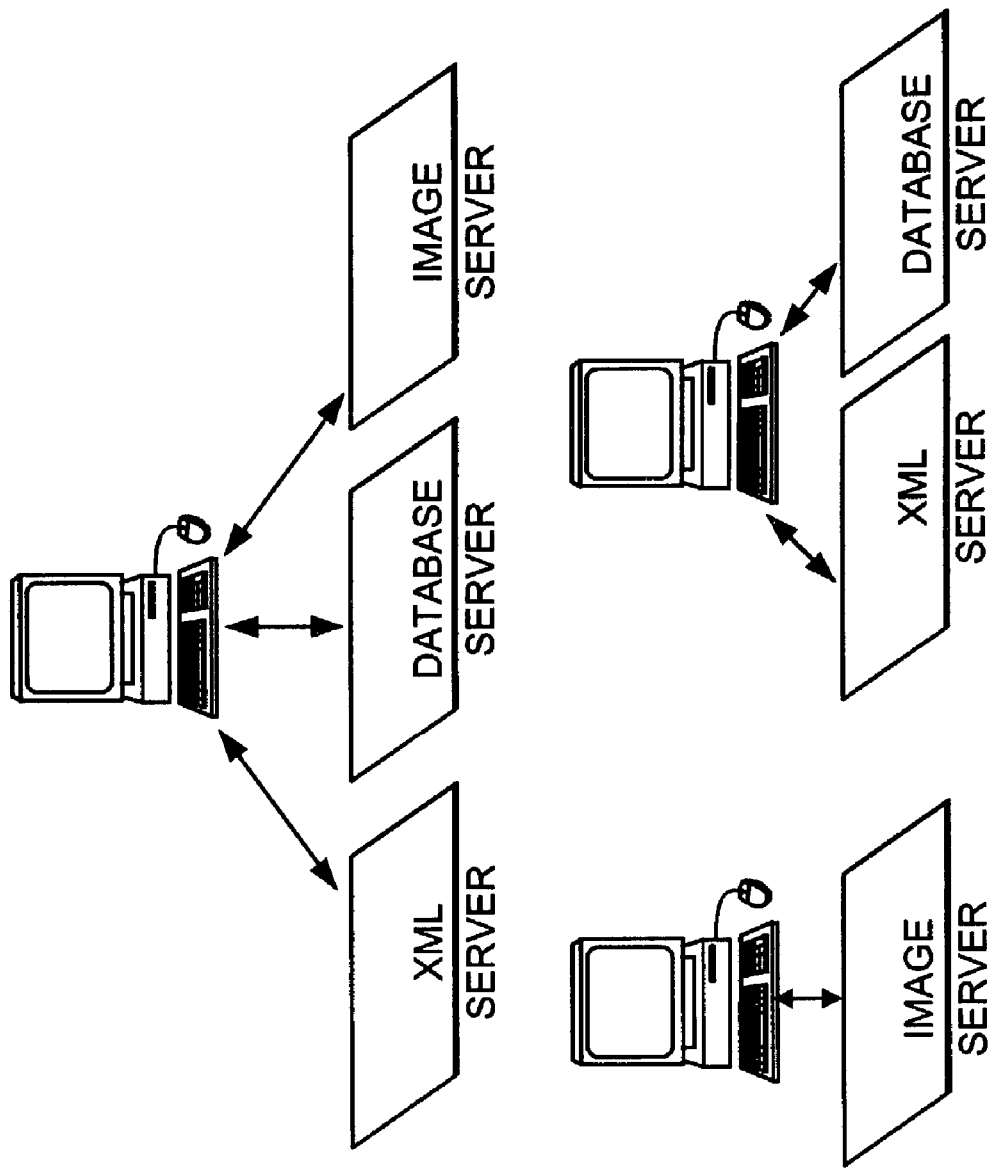
Figure 9:
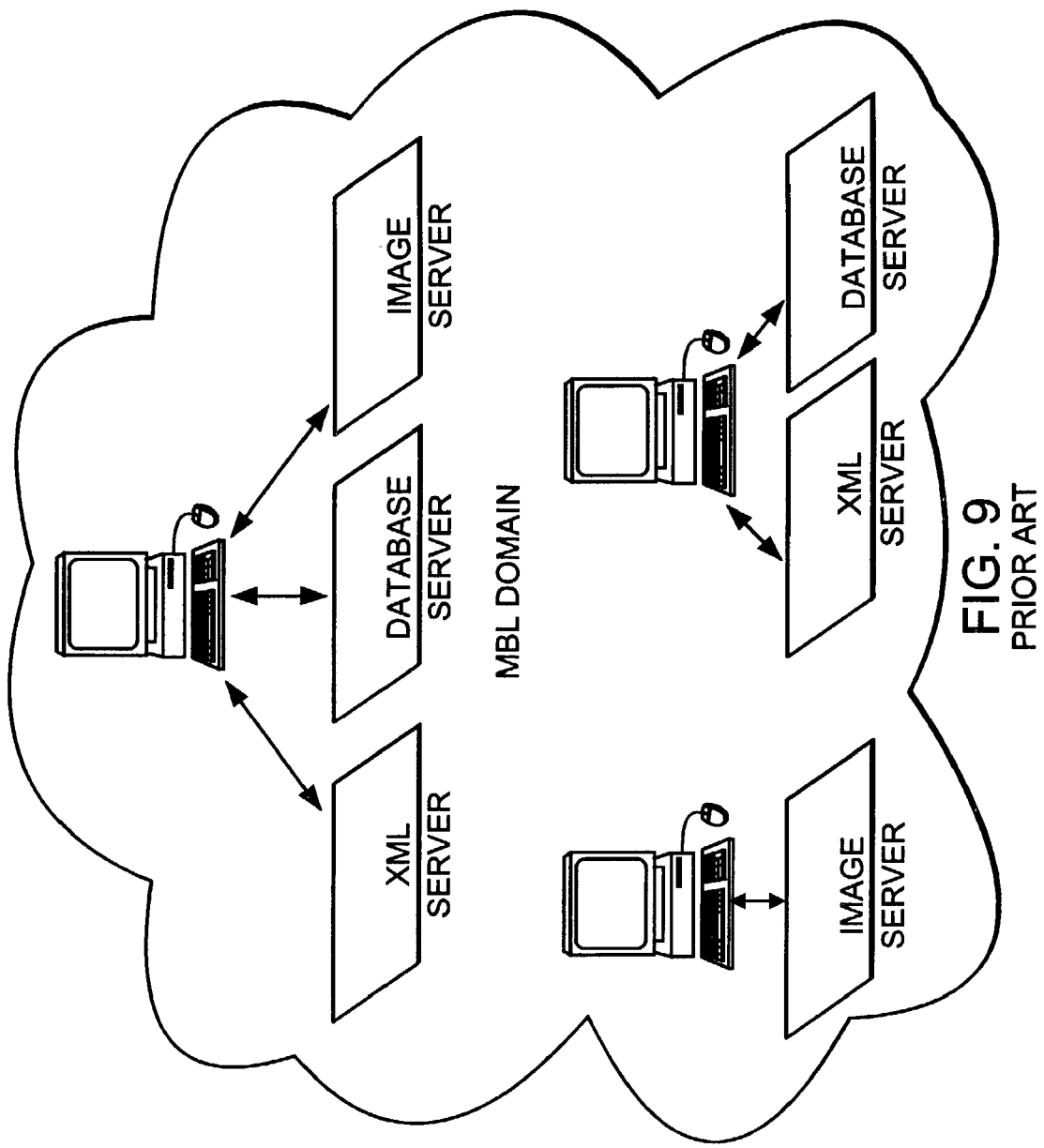
Figure 10:
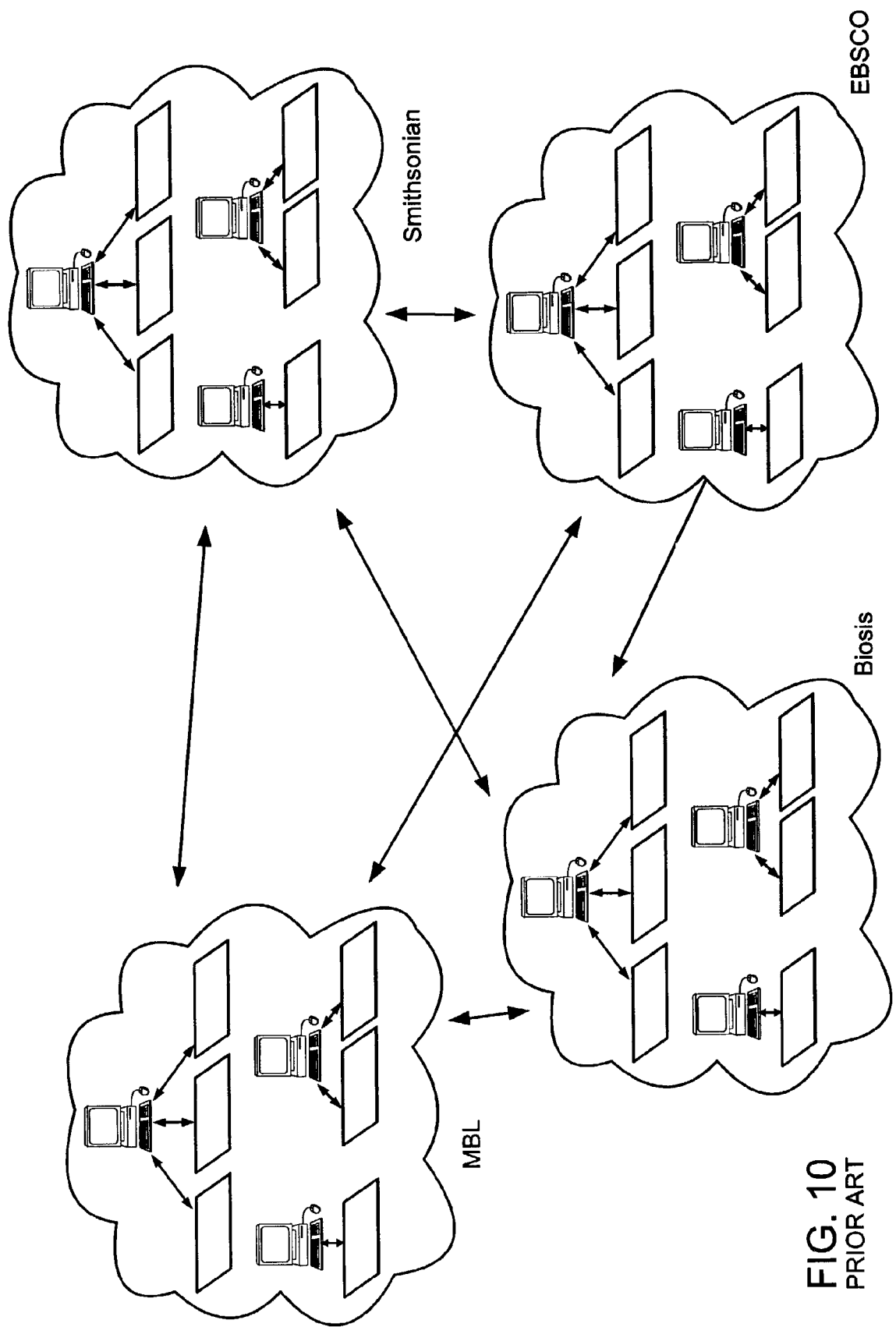
Figure 11:
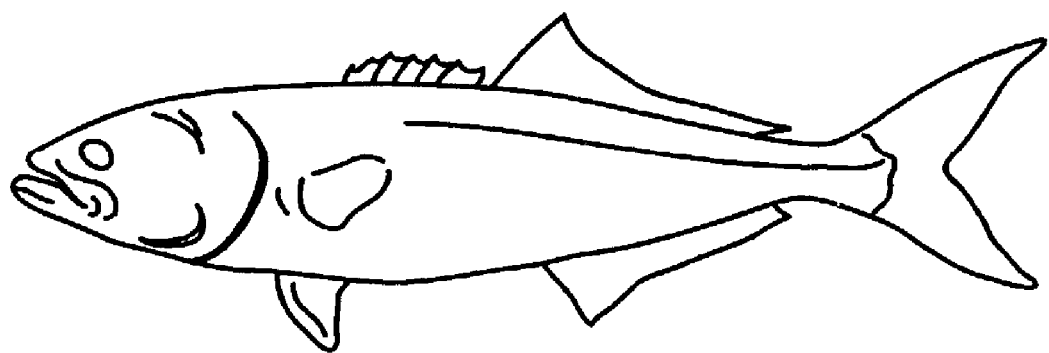

In at least some cases, to be of value, biocentric data must be associated by organismal name information to the biotic entities. For example, the bluefish organism depicted in FIG. 11 has been known to be referenced by the names shown in FIG. 16. The selection of name information can be important. Scientific names for individual organisms rely on the concept of a species. A species is referred to by its binomen. The binomen is a combination of the genus and species name. Recently, taxonomists have used trinomen and even quadrinomen or quadrinomial for referring to specific organisms, but the use of the binomen remains the norm. A trinomen is the combination of a generic name, a specific name, and a subspecific name, that together constitute a scientific name of a subspecies. A polynomen is the combination of multiple names, particularly the combination of a generic name and a specific name and at least one subspecific name. Thus, distinguishable variants within a species (e.g., Spisula soliddisma similis or dog) can be identified.

From an informatics viewpoint, the binomen does not provide a sufficiently stable reference point to link unambiguously to a specific type of organism. The binomen consists of a genus and a child species, which reflects a classification schema that is largely dependant upon the way the field of biology currently organizes the phylogenetic relationships of living things. These classifications vary among different factions in biology, and also evolve over time.

The result is that organisms often have a historical lineage of names reflecting revisions over time, so that one who researches back through the published literature needs to account for this lineage. Thus, it can be difficult for a non-expert to acquire a comprehensive data result at any of multiple levels of data organization (e.g., file, application, host, domain, Internet).

Non-scientific names can add further complications. Common and often ambiguous names are used in all languages to refer to species or groups of species. Even when such names are identified correctly, it is challenging to associate the names, with historical data.

Figure 12:
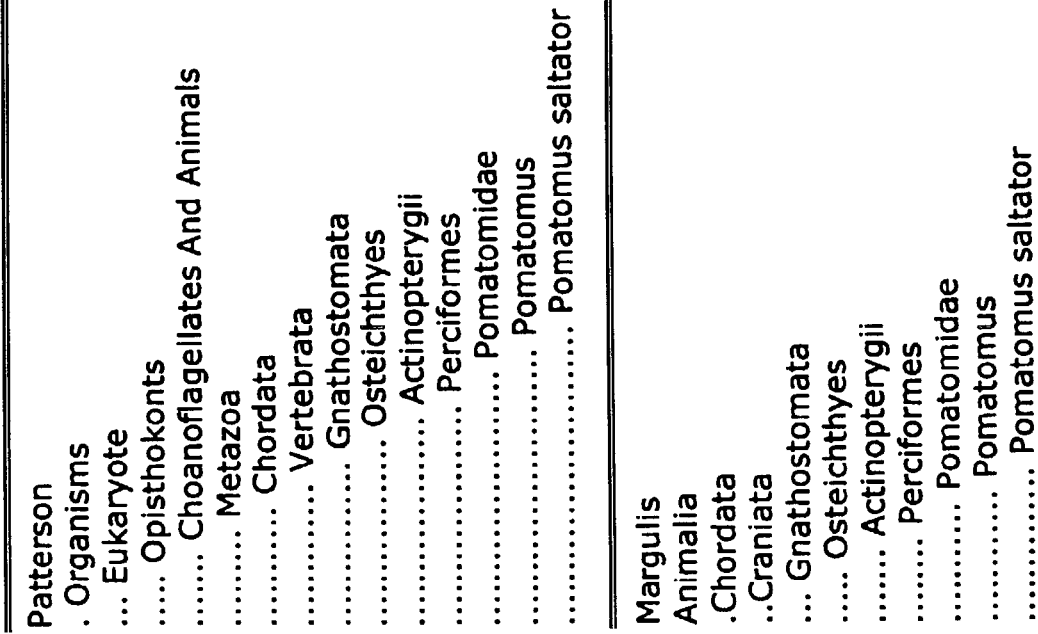

Classification issues are also significant. Organisms are grouped according to multiple criteria and the criteria are applied differently by different experts. For example, the bluefish organism depicted in FIG. 11 has been known to be classified in many different ways, two of which are depicted in FIG. 12. The result is a dynamic and varied assemblage of classifications both of the entire biotic assemblage (e.g., Margulis, Five Kingdoms) as well as within very specific groups of organisms. There is no single universally accepted view of the relationships and classifications of living things.

The classification structures can be a reflection of a deeper understanding of biology or simply an effective way to arrange and view a large and complex set of organisms. From an informatics standpoint, classification offers a contextual structure for navigating from the general to the specific, and has many applications. Many Web sites with taxonomic data provide browsing functions through a classification. As described below, a search system may use a classification system to broaden a search when a more refined query does not return the requisite set.

Figure 13:
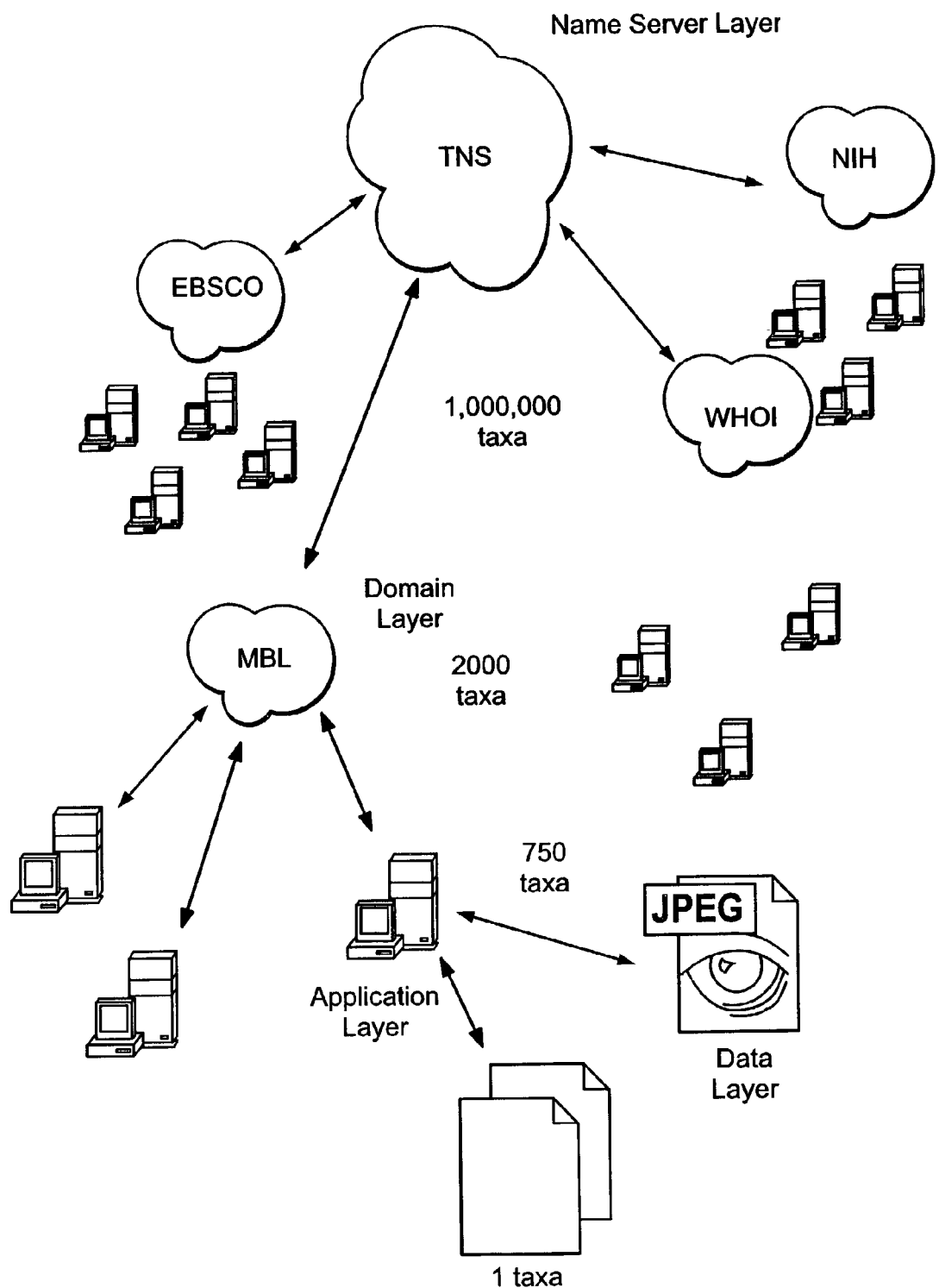
FIGS. 13-15, 17-18, and 38 are illustrations of diagrams of possible configurations used in a taxonomic information system.

As shown by example in FIG. 13, the taxonomic information system (TIS) provides a common taxonomy resolution layer so that data domains can relate, integrate, and associate data along a common pathway. The TIS provides a structured means to locate and associate biocentric data by organism or group of organism regardless of the name or classification that was actually used to record the data.

The TIS has a name server layer, a domain index layer, an application layer, and a data layer. The name server layer is the core of the TIS and has a taxonomic name server (TNS), described below, and provides a consistent mechanism to identify an organism or a group of organisms by any manageable name and to represent the organism or group in any known and manageable classification. The domain index layer represents the edited "tree of life" of all the data elements within a user-defined domain and provides pathways to the data elements. The application layer provides TNS client functions to applications that serve biocentric data, and also provides the domain index layer with the applications' respective coverage of the taxonomic name space. The data layer is a file format layer that contains data element specifications for storing unique identifiers to taxonomic concepts ("taxa") contained in the data. Thus, as described below, ambiguous name information in a historic document can remain unchanged yet can be mapped to a specific taxon.

"Taxon" is the singular form of "taxa". A taxon is an information object that is used either to identify a specific type of organism or to classify a group of organisms. A taxon is also a single branch in a taxonomic classification tree of life. A taxon may represent, for example, a family or a phylum. For example, a particular classification for ducks may have a hundred species of ducks subdivided into twenty genera which belong to three families. In such a case, there are 123 taxa, of which 100 are species, 20 are genuses, and three are families.

The TIS allows name and classification issues to be handled automatically by a computer system. As shown by example in FIG. 14, if a user is searching for data on a certain taxon, the TIS can locate network accessible specific data files regardless of how the name information is recorded. The different, interconnected layers of the system offer data managers the means to derive, from ambiguous names, unambiguous taxa and then to map the taxa to data elements within the managers' control.

In an example implementation, a distributed system links many small databases created and managed by expert groups. The distributed system permits the execution of the many tasks involved in assembling biodiversity information to be distributed across a corresponding community, e.g., a global community of taxonomists and biologists. Tools such as the TNS kernel are provided as described below to link and interrogate distributed databases. FIGS. 36A-36B illustrate a Web page entry point to an example distributed TNS system.

The TIS helps to address specific issues in creating, maintaining, and delivering biodiversity information over the Internet. Taxonomic classification provides a logical structure, described below, for organizing and browsing biodiversity information. Since applications may have overlapping classification trees, the system allows classification information to be created once and used by multiple applications, in a way that can accommodate alternative classifications.

Classification structures also allow context-specific searches to be performed in the data by allowing a system to refine or broaden a search based upon the classification structure, as described below.

Since different names have found use in different places and times to refer to the same organism, it is useful to have a centrally-accessible system that accommodates the different names and that can be used together with data sites.

Figure 15:
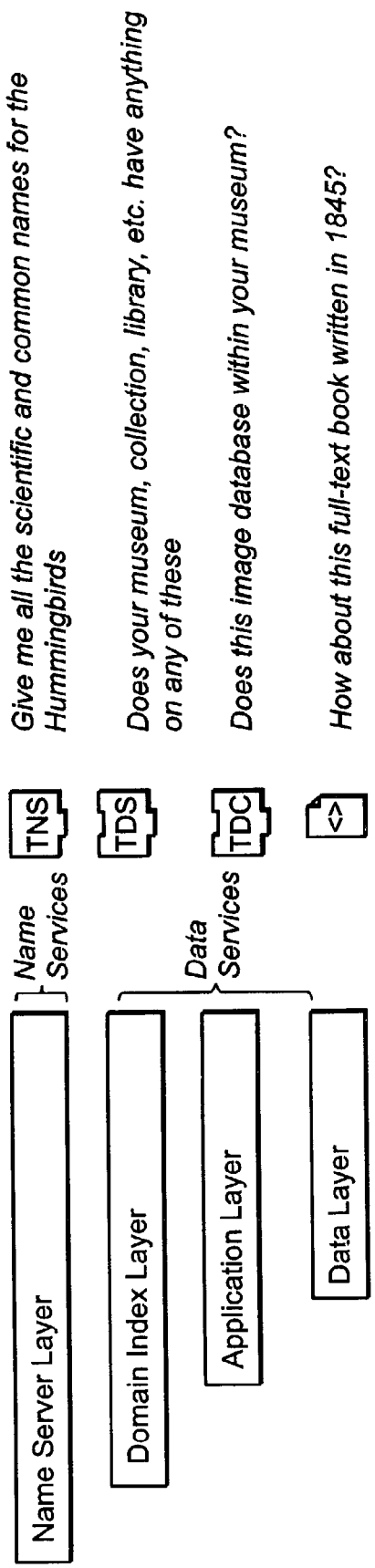

As illustrated in FIG. 15, the system includes a name services component and a data services component. Name services provided by the core of the system are concerned with delivering name and classification information. Data services are concerned with linking content with the name services and delivering the content to users.

As discussed briefly above, the TIS includes a set of four interlinked conceptual layers that provide a logical continuum from a multi-class arrangement of biological nomenclature to specific data elements that are concerned with biological information. The TIS is a scalable system and users can choose to apply one or more of the conceptual layers for their own applications.

The system can provide services to a single computer or for computers on a network such as the Internet. The name server layer provides a uniform interface for resolving name and classification information for a given taxon, and can be used as an indexing tool for satellite data (i.e., data that is not locally accessible) as well as a data service for building local taxonomic classification trees. The name server layer accepts lists and classifications of biological entities and provides services based on the lists and classifications, including services such as services related to custom classification procedures that allow users to create new taxonomic lists and databases.

Figure 31:
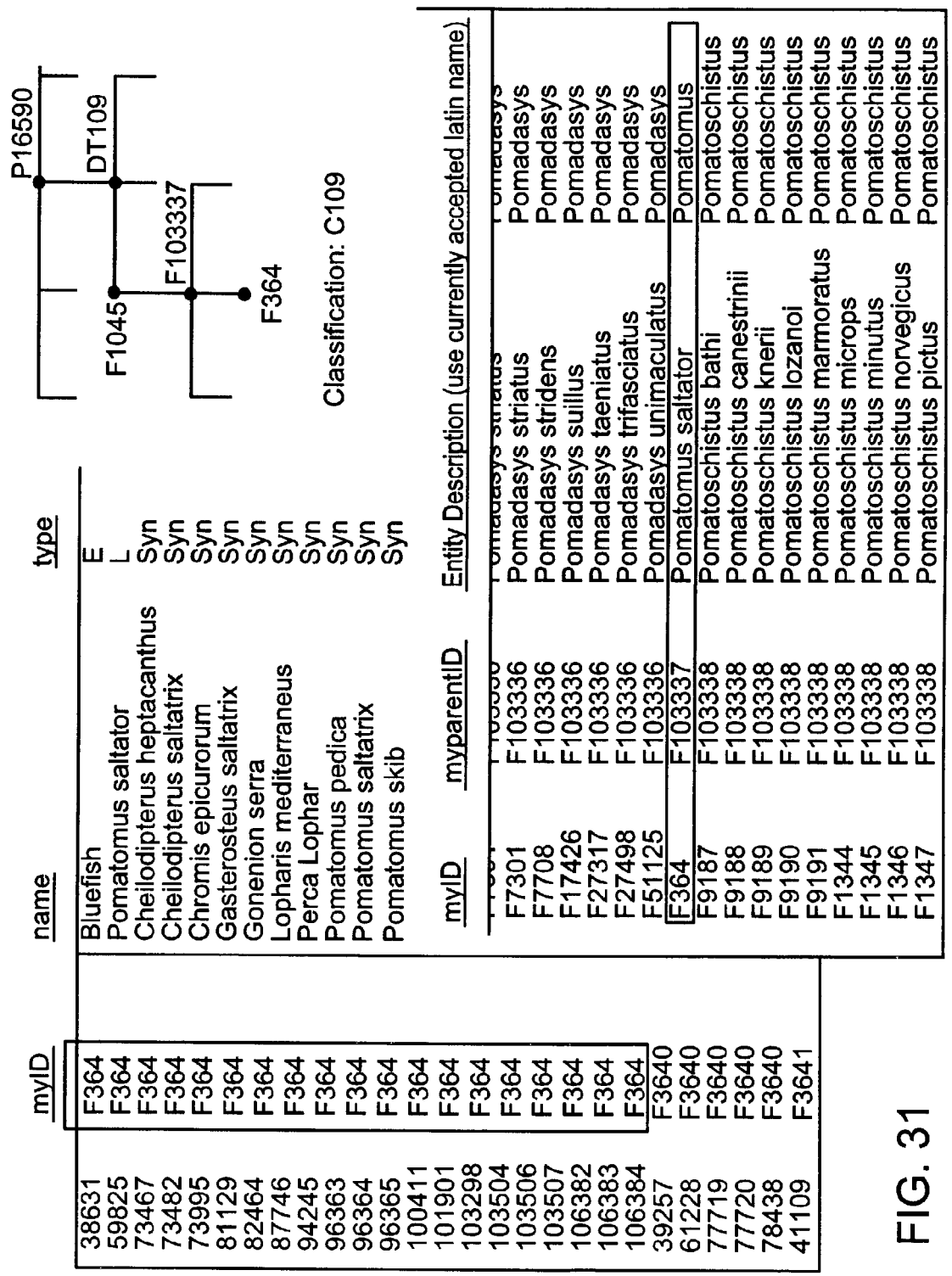

In particular, the name server layer resolves name-related issues, provides classification of taxa, represents multiple classifications of taxa, provides a single, stable network interface for the data, and provides flexible output formats (FIG. 31). By splitting the indexing of site-specific data to a layer which references the name server layer, the name services can be used to provide authority information to multiple users for their own taxa. In a representative implementation, the Name Server serves as a source of name and classification information for clients that request the information. The name server layer includes a data model that has at least three significant components: taxa, names, and classifications. A taxon is described above and is based on a formal description or declaration published by a taxonomic expert. Names, which are organized around taxa, are character strings used to represent the taxa and to locate information resources associated with the taxa. As described above, taxa are organized into classifications that relate taxa to each other. Relationships are typically parent-child, but other relationships are possible, depending on the classification.

Thus, the three components allow names to be associated with taxa and taxa to be organized according to more than one classification, including classifications that are not based on biological systematics (the evolutionary interrelationships of living things).

The domain index layer is used to index and serve pointers to data within a user-defined domain of applications. Each organism within the collection of resources of the domain is indexed and linked to its associated key in the name server layer, which provides the domain with the synonymy and classification services of the name server layer and a domain-specific tree representing the classification of its taxa. As described below, the classification tree can be used to browse and link to specific applications and can be exported for custom use. The domain index layer also allows a domain to cross-reference its indices and holdings with other domain holdings through the use of linked taxonomic data servers, e.g., as described below in connection with the kernel.

Figure 32:
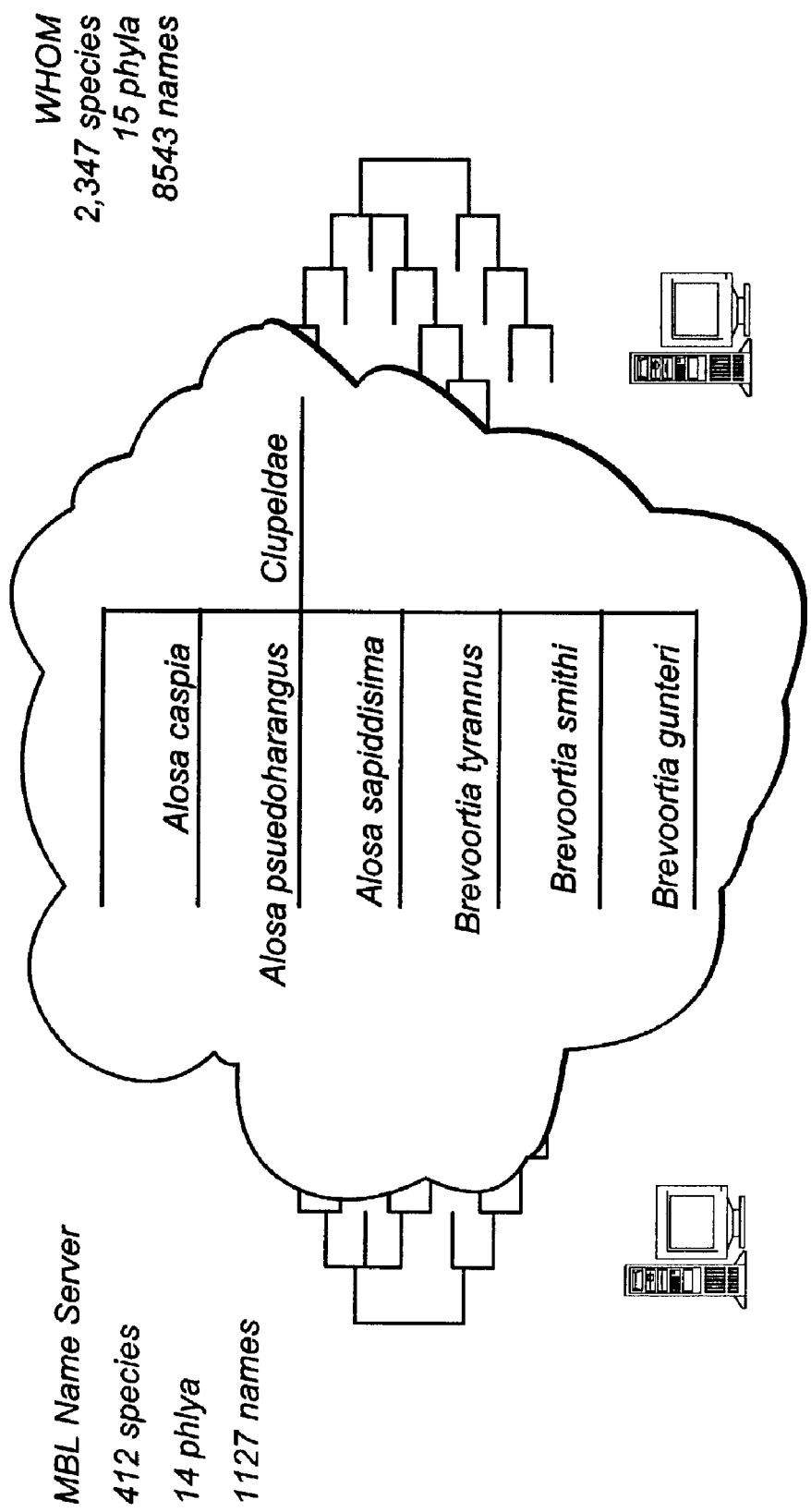

In particular, the domain index layer indexes taxa within a domain using the name server layer, provides a means to supply the capabilities of the name server layer to data resources within the domain, and manages a linked list and provides a means to create a single point of entry to a site via a classification tree (FIG. 32). The domain index layer employs a taxonomic data server that provides an interface for linking the resources of different domains at many levels. The domain index layer has a bidirectional feature such that the domain index layer points to name server elements and the name server can be used to point to data servers, which provides data servers with peer-to-peer features. If a user is concerned with a particular group of organisms, the data server can be set to automatically query the name server appropriately when new resources become available online. As shown in FIG. 33, if the data server is provided with a list of species, the data server provides links to all the known associated names. One or more classifications may be selected for browsing, using formal Latin names or substituting common or other language names. One point of entry is provided via classification.

The application layer interacts with software applications to provide services from the name server and domain index layers through the use of program libraries and application programmer interfaces (APIs), which allows developers to build the services of the name server and domain index layers into software applications.

Figure 34:
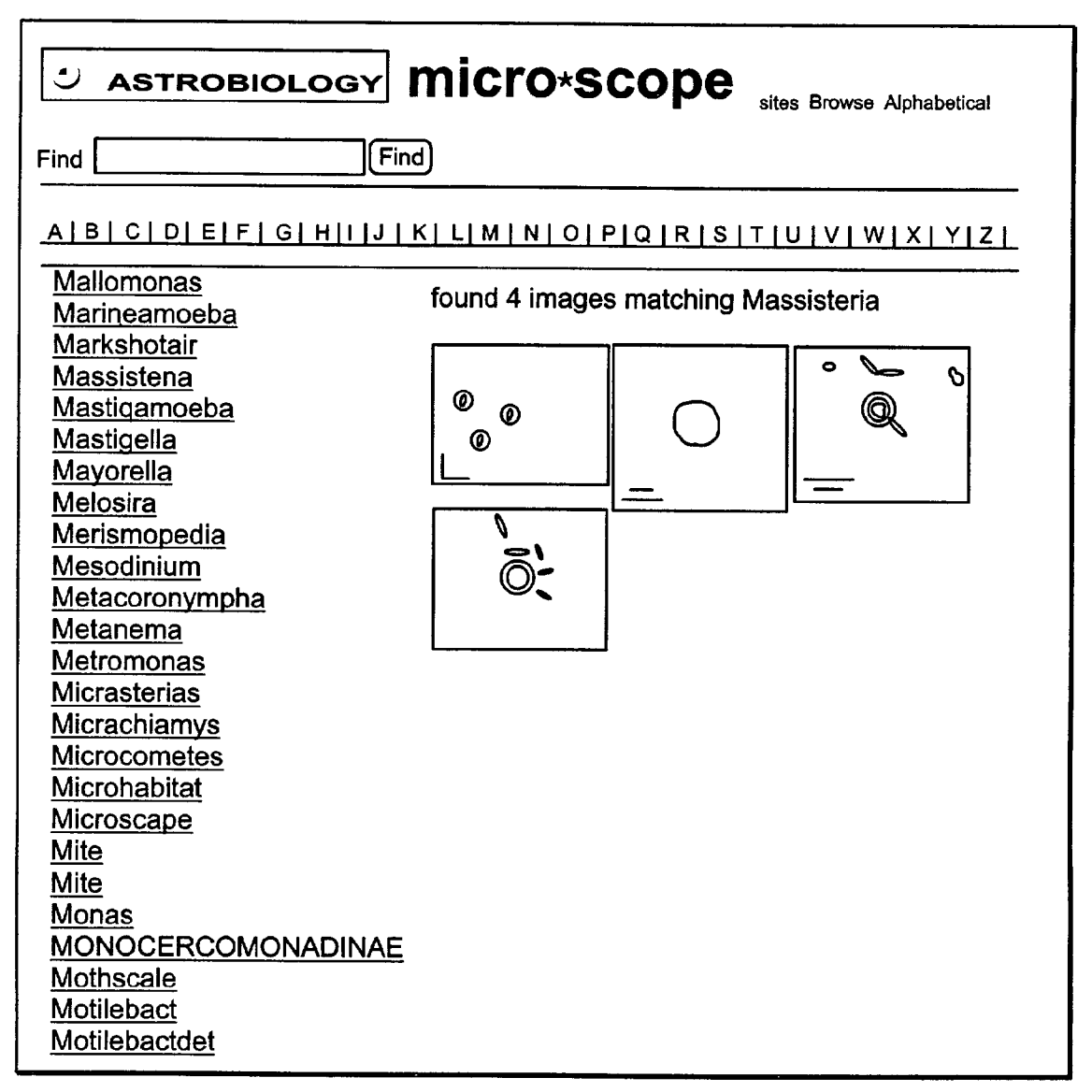

In particular, the application layer includes programs and programming code that use a common API to provide services of the name and domain layers to individual programs. Developers can insert the code into their applications. As illustrated in FIG. 34, a Web application uses particular libraries to integrate taxonomic name service features into a "micro*scope" application, in which alphabetized listing and Find features are linked to the name service layer.

The data layer refers to specific file format technology for full-text or other documents which are able to identify taxa that can be mapped by using the name server layer. In one embodiment as described below, the file format technology includes custom SGML/XML Document Type Definitions (DTDs) and database schema that are customized for use with the TIS.

The TNS includes a distributed network service employing a client/server architecture to deliver taxonomic information over, for example, Transmission Control Protocol/Internet Protocol (TCP/IP) via distributed clients and embedded client libraries. The data delivered by the server provides a stable reference structure for indexing content containing information about living and extinct organisms, e.g., as described in the voyage report example discussed below.

To provide a standard means to deliver name and classification information about organisms, the system is configured as described below to recognize substantially all of the known names for an organism and substantially any classification of an organism, and is able to flexibly provide at least some of this data through a standard API.

The basic structural element of the Name Server is the taxon. Each taxon exists independently of any particular single name, but a canonical name may be stored and used to refer to the taxon. Each taxon serves as a declaration or a definition representing a taxonomic concept.

For example, an organism known as the bluefish or Pomatomus saltator was described by Linneaus in 1758 as having two dorsal fins and large, powerful jaws. As shown in FIG. 16, the bluefish organism is known by at least 17 formal names and has been classified by some ichthyologists as being related to the Carangids ("the jacks") and by other ichthyologists as being related to the Serranidae (Sea Bass).

As described in more detail below, the taxon-based system maps, and provides qualification information for, the names used by a taxon. Each taxon is associated with multiple names that may have different meanings. For example, scientific names tend to be more refined and more specific than common language names. In particular, in the usual case, there is only one scientific name that is a widely accepted name. Other names may have fallen out favor or may have been replaced. The qualification information may also identify any original name, the person who discovered the organism and named it (if known), and the language (e.g., French) of the name. In a specific implementation, the qualification information is based on manual assessments and is recorded in the names table. Thus, searches can be executed that use, for example, only scientific names, or only common names, or only French names, or only modern names.

In a specific implementation, the names include historic scientific names (scientific synonyms), common English names, and non-English language names. Thus, a user of the system, such as a person or a computer program, can find information pertaining to the taxon without knowledge of all or many of the taxon's names. An entry in a data resource may use any of the names to refer to the same taxon.

Organisms may be reclassified when new information (e.g., about their origin) comes to light. Genomics, for example, is finding new ways to identify the ancestry of organisms using genetic homologies, which has led to the reclassification of many organisms, and some of the reclassifications are in contention. As described below, the name server is able to represent traditional classifications as well as the reclassifications and other variations. Some classifications may be geared toward classifying organisms by a non-scientific (e.g., consumer-level or human medical) classification. For example, organisms may be classified as poisonous or non-poisonous, or parasitic or non-parasitic.

In a specific embodiment described in more detail below, the system has at least three organizational data tables: a taxon table in which each entry has, among other things, a taxon identifier; a name table in which each entry associates a name with a taxon identifier (and multiple entries may associate multiple names including scientific and non-scientific names with any particular single taxon identifier); and a classification table. Each entry in the classification table specifies a taxon identifier and associates the identifier with a classification system and another taxon identifier representing a parent taxon. Thus, for example, the taxon table may have entries having respective tax on identifiers "101", "201", the name table may have entries that associate the name "mammal" with taxon identifier "101" and the name "dog" with taxon identifier "201", and the classification table may have an entry associating taxon identifier "201" with an "elementary" classification system and parent taxon identifier "101". In such a case, the entries signify that in the "elementary" classification system, taxon "201" ("dog") belongs in a category represented by taxon "101" ("mammal").

A particular representative implementation has specific data elements in particular tables. Each row in the taxa table represents a single, unique taxon that has the following elements:

"myID varchar(12) NOT NULL", which specifies the taxon identifier (e.g., F100190);
"name varchar(60) NOT NULL", which specifies the preferred form of the taxon's name, updated from names table;
"rank varchar(16) NOT NULL", which specifies the taxonomic rank of the taxon (e.g., species or family); and
"ref varchar(255) NOT NULL", which specifies a reference to a publication in a publications table that lists representative publications.

Each row in the names table has the following elements:
"uid int(11) DEFAULT '0' NOT NULL", which specifies a name identifier;
"myID varchar(12) NOT NULL", which specifies a taxon identifier and thereby links the name to a taxon;
"name varchar(100) NOT NULL", which specifies the name itself;
"type varchar(4) NOT NULL", which specifies a name type (e.g., Fr=French, SYN=junior synonym); and
"ref varchar(255) NOT NULL", which specifies a reference, if any, to the origin of the name or an example of its usage.

Each row in the classification table has the following elements:
"cid varchar(12)", which specifies a classification identifier for the selected classification system;
"myID varchar(12) NOT NULL", which specifies a taxon identifier;
"RELA varchar(12)", which specifies the nature of the relationship (e.g., child, or parent);
"ID2 varchar(12) NOT NULL", which specifies another taxon identifier (usually representing the parent).

A CX table stores information about the multiple classifications represented by the Name Server. As discussed above, some classification systems are broad (e.g., reclassifying all living things) and others are narrow (e.g., where specific species are in dispute). Each row of the CX table has the following elements:
"cid varchar(4) NOT NULL", which specifies an identifier of the classification system;
"name varchar(255) NOT NULL", which specifies a short name of the classification system (e.g., The Sibley Classification of Birds);
"root varchar(12) NOT NULL", which specifies the taxon that represents the root of the classification (for example, D186 (Cephalopods) is the base of a classification of Cephalopods);
"pref tinyint(4) DEFAULT '0' NOT NULL", which specifies the ranking of the classification (e.g., 1=preferred or default);
"ref tinytext NOT NULL", which specifies a references identifier; and
"description tinytext NOT NULL", which specifies a full text description of the classification system.

Accordingly, the system is able to represent real-world classifications of taxa so that users can select and use the classifications that are pertinent and appropriate to their work and locate information resources accurately and efficiently.

Generally, a taxon in the TNS is associated with two data types: semantic data and syntactic data. Semantic data includes data elements that a human being uses to authenticate and/or validate the data. In at least some cases, semantic data is not required by the system's procedures or functions, but can make the system more useful to human users. For example, the name qualification information for taxon names can indicate to a human user that a particular name is the currently accepted form, and is not a synonym or a Spanish name. A scientific name may also have a reference to a person, to a date, or to a specific publication where it is believed the name or taxon was first described. The semantic data helps to validate a taxon by allowing a user to evaluate the semantic data based on the user's own experience and knowledge.

Syntactic data includes data elements of the underlying functional schema of the database. For example, in at least some embodiments as described herein, it is important to the system that each taxon has a respective unique identifier that is referenced in a relationship table that describes a classification tree. In particular, the relationship table contains qualifiers that describe relationships among taxa. In an example, a taxon representing the genus "Pomatomus" has a child relationship to a taxon referred to as "Pomatomidae".

In some embodiments as described below, the name server layer may track and serve data on multiple conceptual levels, including information on individual taxa, classification of multiple taxa, and classification types. Information on a single taxon includes at least the names that have been used for the corresponding organism. The classification of multiple taxa indicates any siblings, parents, and children of the taxon, and the classification type indicates the classifications that include the taxon.

In a specific implementation as described above, the data is stored by the name server layer and served by the TNS. Data storage techniques may be used to help maintain data integrity, e.g., by storing data elements such as names only once. For example, the name server may provide a user with a table of names of ducks with each row containing the family name "Anatidae", but the "Anatidae" family name is stored only once in the database. In an example described below, the server uses a standard syntax that can be employed by a person or a program to query the server and instruct the server to output the returned data in user-specified formats.

Figure 14:
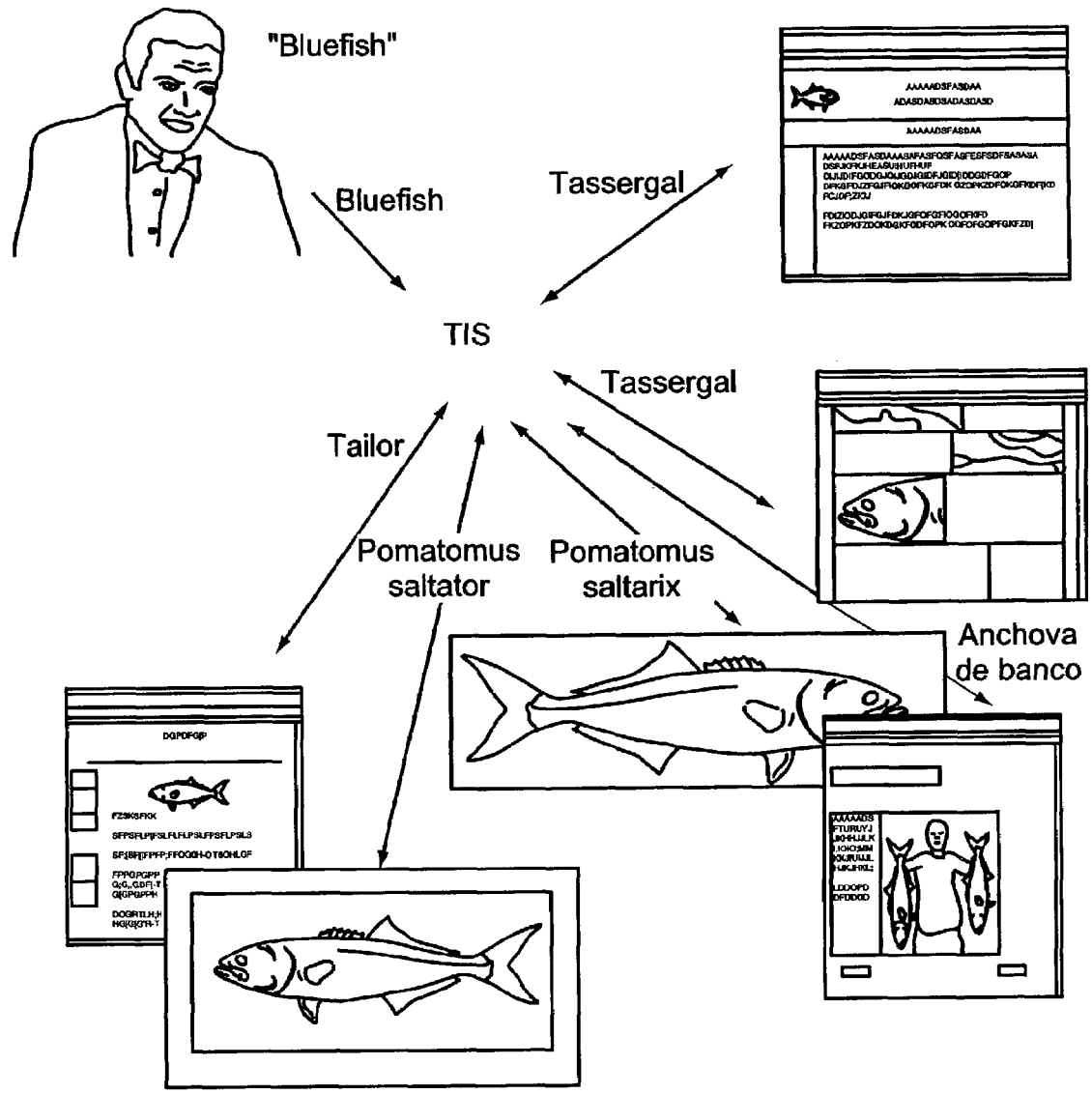

FIG. 14 illustrates an example of a user's perspective of a use of the system. The user may be a person or a program communicating with the name server to search for information about a species of fish, Pomatomus saltatrix, which the user knows as a "bluefish". FIG. 14 illustrates an example response from the name server. FIGS. 37A-37C illustrate various output formats that are served by the name server layer via the TNS. A corresponding full International Commission on Zoological Nomenclatures (ICZN) classification with "##" as a delimiter is shown in FIGS. 37A-37C.

As described in more detail below, the TNS layer is scalable and distributed so that taxonomic information can reside at different locations. The arrangement, which helps to distribute storage and retrieval of data among multiple machines, breaks up the task of managing dynamic taxonomic data among multiple managers.

Figure 17:
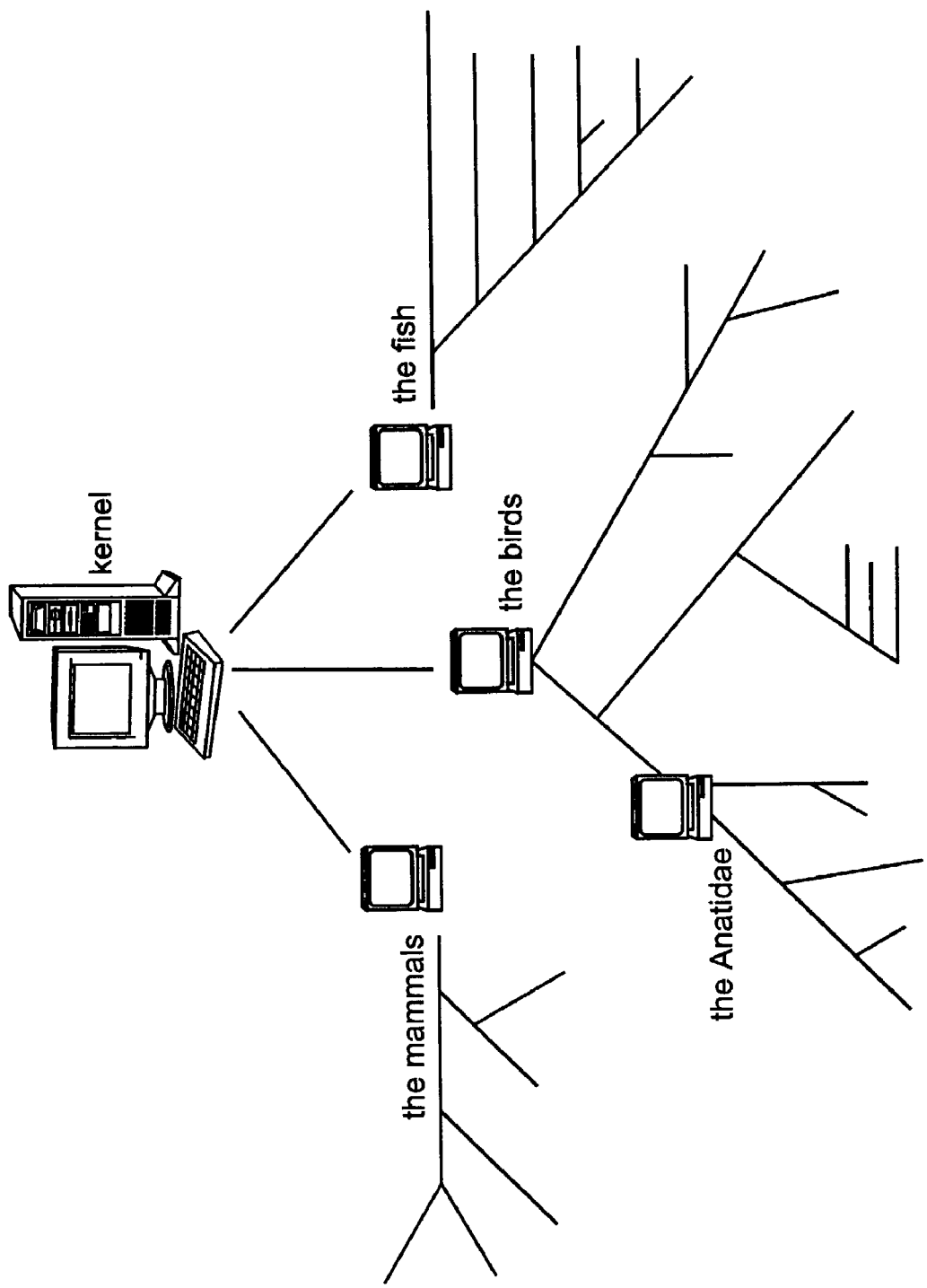

In a specific implementation as illustrated in FIG. 17, a name server kernel includes software that manages and maintains the structural integrity of the name server layer. The kernel also keeps track of all or many of the name servers in a particular name space (the scope of a name server layer) and assigns unique identifiers to the servers in response to requests from the servers. Different organizations can manage their own name server layers by managing separate kernels. For at least some purposes, a single Internet wide name space can be highly effective. In particular, responsibility for handling information requests may be distributed and divided up among multiple actors, and administered by the kernel. For example, responsibility may be divided up by subject matter area, so that information requests pertaining to fish are handled by a first actor and information requests pertaining to plants are handled by a second actor. The use of multiple kernels allows actor resources to be organized differently depending on different organizations' preferences. Accordingly, a first organization can use a first kernel to cause the first organization's fish information requests to be directed to actor X, while a second organization uses a second kernel to cause the second organization's fish information requests to be directed to actor Y.

In an example arrangement, the kernel compiles indexes of the contents of the distributed servers, and the servers handle processor intensive functions, such as generating full taxonomic trees. In the case of a name server layer that uses one taxonomic name server, the kernel and the name server are on the same server. When two name servers are used, one of the two servers can manage the kernel or the kernel can reside on a third server. In a specific implementation, in the same interface for any name, a user can be presented with one or more of the following: a single preferred name, a list of names, an array of classifications, a user specific database of name and/or classification data, and a Web browser presenting such data.

Data caching is used by a specific distributed system version of TNS, in which different parts of the database reside on different servers. Each of the servers keeps a list of the other servers that form the system. In a specific implementation as described in more detail below, name servers cache each other's authoritative data so that the entire tree is distributed. Thus, the service load can be distributed across multiple machines. A particular name server therefore can serve any data but can make changes only to elements the server is authorized to change.

A server can be a primary server or a secondary server. Primary servers have authority to make changes to parts of the distributed database. Secondary servers only serve information to clients. Each server can store a copy of the entire TNS database. Some or all of the data may be cached through updates from other servers having authority to make changes.

Primary servers contain authority tables which designate the name server elements the servers are authorized to change and the particular servers that can change them. Thus, a name server is authorized to makes updates and inserts on a subset of the database served by the server. The remainder of the database is data cached from other name servers. The distributed architecture spreads the load across the network of name servers.

The data structures used to manage authority may be authority tables that refer to groups of taxa. The groups are associated with specific name server addresses. Additional elements may be supplied that define when the current cached information should be discarded and a new update query should be made to a primary name server.

Secondary name servers receive all of their data from primary name servers and have no authority to make updates or inserts.

Figure 18:
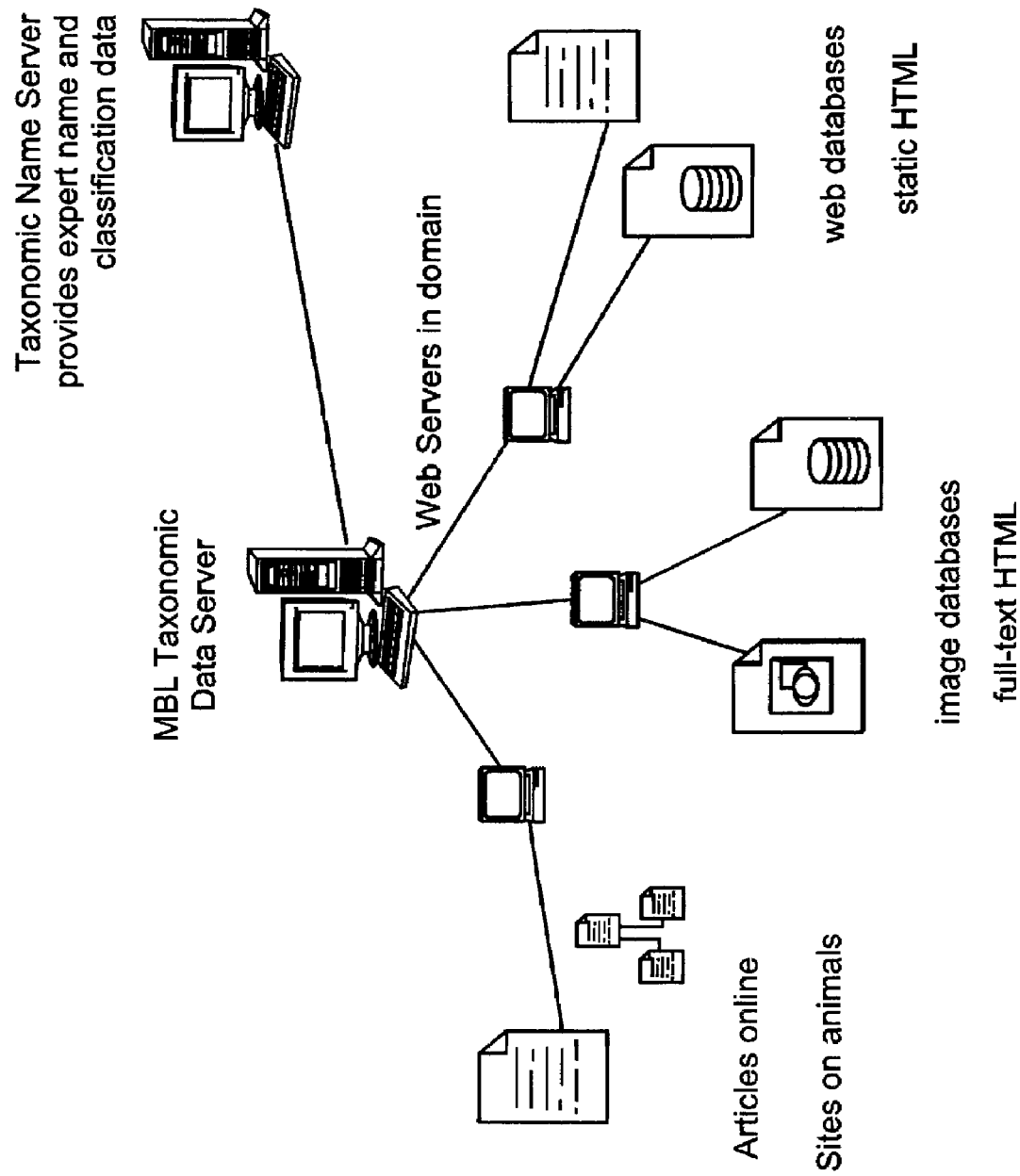

An example of a domain index layer is illustrated in FIG. 18. When two or more organizations share the same name space, the taxa associated with one organization (or domain) are separated from the taxa that are represented in the entire name space. For example, the name server may contain name information on 20,000 fish species but name information for only 300 fish species may be within a particular domain. It can be advantageous to only have to browse through a classification tree of relevant taxa.

The name server layer is entirely or largely separated from domain-level considerations through the specifications of the domain index layer, which provides taxonomic information services that use the name server but apply the services at the domain level. The domain index layer also organizes any applications that employ embedded TIS libraries.

The domain index layer uses a taxonomic data server (TDS) that manages a list of species that pertain to data within the domain (e.g., data that is accessible through a Uniform Resource Locator/Uniform Resource Identifier (URL/URI)). As a result, a pruned "Tree of Life" presentation is provided that is representative of the domain in the classification or classifications chosen by the domain manager.

The TDS matches the list with the full classification information available from the name server. The TDS can provide the browser with a classification of only those organisms represented within the domain or include multiple domains' classifications. The system allows a user to type in a single name, which may be outdated or current, and scientific or common, and be directed to much or all of the resources at one or more institutions that pertain to the named taxon and, depending on the implementation, to parents or descendants of the named taxon.

As noted above, each taxonomic data server maintains a list of the species represented within its domain. Different taxonomic data servers can gain the benefit of indexing from a single name server that stores taxon identifiers, so that the data servers share the same classification structures. Since the data servers use the common reference structure from the name server, it is possible for the servers to index each other. For example, one library's content administrators who wish to collect more data on crustaceans can set their library's TDS to request crustacean resource pointers from another library's TDS and add the pointers to the first library's listings.

Data can be input to a TDS by providing the TDS with a list of taxa and associated URLs file pointers. The TDS looks up the taxa names and resolves name issues with the user before mapping the taxa to the TNS unique identifiers. After the user selects one or more classifications, the TDS builds one or more domain classification trees that can be used directly with a Web server or exported to output files for embedding into applications.

The Taxonomic Data Servers can be automated so that applications that utilize the tools of the TIS application layer can communicate with the domain layer and automate the indexing of the applications. For example, such an application can be provided with a file having a list of species, and return name or classification information in a wide range of output formats. Also, an application can search through a Web site and match names from the Web site against the list of names on a name server and build indexes to Web pages. An end result managed by the data server may be lists of names linked to resources within the domain. Since the names are indexed to the Name Server, the user has great flexibility in navigating the sources.

Data sources can be static (e.g., a Web page in many instances) or dynamic (e.g., created "on-the-fly" from database systems). In some cases, Web pages also can be dynamic. Static Web pages have single addresses that a user can cite. For dynamic resources that have variable address names, a content developer or administrator creates custom URLs to point to the desired information, which can be the result of a complex query.

Figure 38:
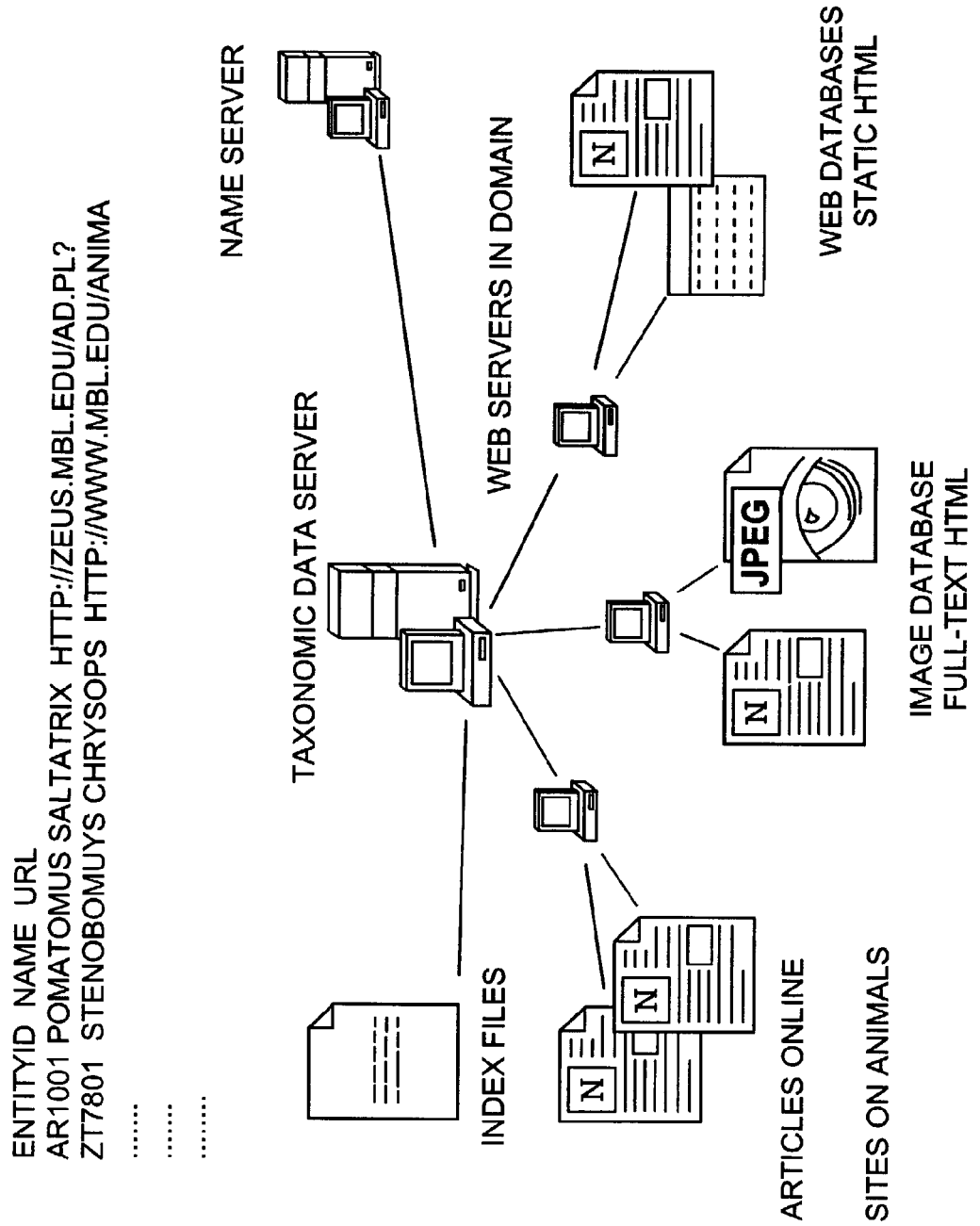

For static URLs, it is effective for taxonomic data servers to group resources as a unit and link URLs with taxon identifiers. Handling dynamic URLs can be labor-intensive. It may be desirable to build name server features directly into data systems, browse a classification tree of an arbitrary subset of organisms (e.g., 200 selected invertebrates), allow a user to type in virtually any name for a particular database (e.g., a fish database) as well as a catalog (e.g., of fish and invertebrates), and provide users with specific database information when the users are browsing a domain (e.g., thumbnails from an image database for the current group being browsed). As illustrated in FIG. 38, a single taxonomic data server indexes the contents of multiple HTTP servers within a user-defined domain. The contents' resources are indexed to a remote taxonomic name server.

The application layer of the TNS provides APIs including software plugins and libraries of programming code that allow a developer to build the functionality of the name and data servers directly into an application. The application layer allows a developer to permit a user to search for an organism in the developer's database using any of the organism's possible names known to TNS. The libraries allow a developer to build a navigable taxonomic tree into the developer's system.

The APIs allow developers using the name server to customize the appearance of the output of the name and data servers within the developers' own applications. If an application contains references to multiple organisms, a developer can use the name server to build a custom "tree of life" for those organisms that can be used to browse the database.

Examples of applications that can use the application layer code to interact with the name server include a Compendium of Marine Eggs and Embryos, Fish of the North Atlantic, Marine Organisms at the MBL (see FIG. 20), and Micro*scope—Database of Protist Images and Information.

In a specific embodiment, the code library includes the following elements available in C, Perl, and PHP (see FIG. 19):

Database connect functions to the name server.
Function libraries that enable the developer to program custom taxonomic elements into their applications.
Applications that can help a developer index their taxonomic content to the name server.

Taxonomic data clients (TDCs) are applications and plug-ins built around the code library, and allow developers to build networked client software that can browse through a domain's listings or interact directly with a name server or both. FIG. 21 shows an example in which a data browser uses name server information to allow a user to browse the holdings of a data server of a sample site (MBL). The name server provides name authority information that the data server cross references with the sample site's data holdings. The example shows that the sample site's data holdings have been additionally indexed with a controlled subject vocabulary. In the example, the subject tree is currently selecting "Keys" and listing known taxonomic keys that contain references to a species of pufferfish. The listing shows keys at domains other than the sample site, because the sample site's data server has been set to search for other data servers that index taxonomic keys to the subject, e.g., a particular family of fish. The example data browser uses all layers of the taxonomic information system. The application interacts with both a taxonomic data server for a domain and a taxonomic name server, and provides an index of the domain's resources cross-indexed to a subject classification tree. If the domain indexes other data servers (which is the case in the example here), the resources of the other data servers are available for presentation as well. In the example, the first resource listed is a Systematic Key to the Tetraodontidae which utilizes a known data format, which allows the browser to query the document as a database and retrieve portions of the document (e.g., 6 images and a portion of the key matrix).

An example of the data format layer is provided in FIG. 22, which illustrates a page from the voyage report "Report on the Scientific Results of the Exploring Voyage of the H.M.S. Challenger 1873-76." The pertinent volume has more than 800 pages that record biological samples taken during the course of the voyage. The volume includes references to thousands of organisms collected during the expedition; all of this information is linked to the names and classifications of the organisms according to the systematics that were used in the years 1873-76. Many current researchers would not be able to determine whether the names on the pages are the currently accepted names, and it is probable that no single person could so determine for the entire volume.

FIG. 35 illustrates a particular example from the "Summary of Results, First Part, 1895" of the voyage report, which includes catch records and notes for thousands of organisms. On an initial conventional review, it is unclear how many of the cited names are current now, and whether entries in the report can be linked to other related pieces of information. At the time of the publication of the report, the cited fish "Ipnops murrayi" was the only known species in its genus. At various times in the cited fish's known history it was also known as a member of the genus Ipnoceps, and was also known as the species "agassizii". The cited fish's species classification was subsequently split into two species, "murrayi" and "pristibrachium".

The data format layer includes mechanisms described below for isolating taxonomic name information and linking such information to the TNS. The mechanisms allow a document such as a page from the voyage report to be quickly "contemporized", as described below, while retaining the document's original content, including the document's original organism names.

The contemporizing of documents, which is convenient for readers, makes possible associations and linkages by computer programs within the context of systematics. For example, if a user is searching for information on "requeim sharks", the system can determine that "requeim sharks" refers to the Carcharhinidae and that a member of the family is Carcharias littoralis, which is currently known as Carcharias taurus and has also been known as Odontaspis taurus. With reference to FIG. 23 (from Bumpus, H. C., "The Breeding of Animals at Woods Holl During the Summer Months of June, July, and August", Science, New Series, Vol. 8, No. 207. (Dec. 16, 1898), pp. 850-858), an XML tag within the BIO Document Type Definition (DTD), described in more detail below, identifies a taxonomic name, records the original (source) string and maps it to the TNS unique identifier code. XSL can be used to substitute in any desired name or to leave the name in its original form but allow searching on the current name to locate the document, as shown in the following example:

```
<tns myID=F747 source="Carcharias littoralis"
    ref="">
```

Document oriented data types, such as XML DTDs, are used that have elements in their structures to accommodate name service layer data elements. Thus, a single point of entry is provided and browsing is permitted for a library of full-text documents. Retrieval of data may be performed at a high level of granularity. For example, a request may be submitted to "Search all books for any references to any member of the Family Anatidae and return only the paragraph where the entry resides", or to determine "What page are the bluefish entries on?".

In a particularly powerful application, a Web search engine may use the application layer to find relevant data regardless of the name used.

An example of an application that uses elements of the data format layer is the MBL Compendium, "Methods for obtaining and handling marine eggs and embryos" by Donald Costello and Catherine Henley.

Figure 25:
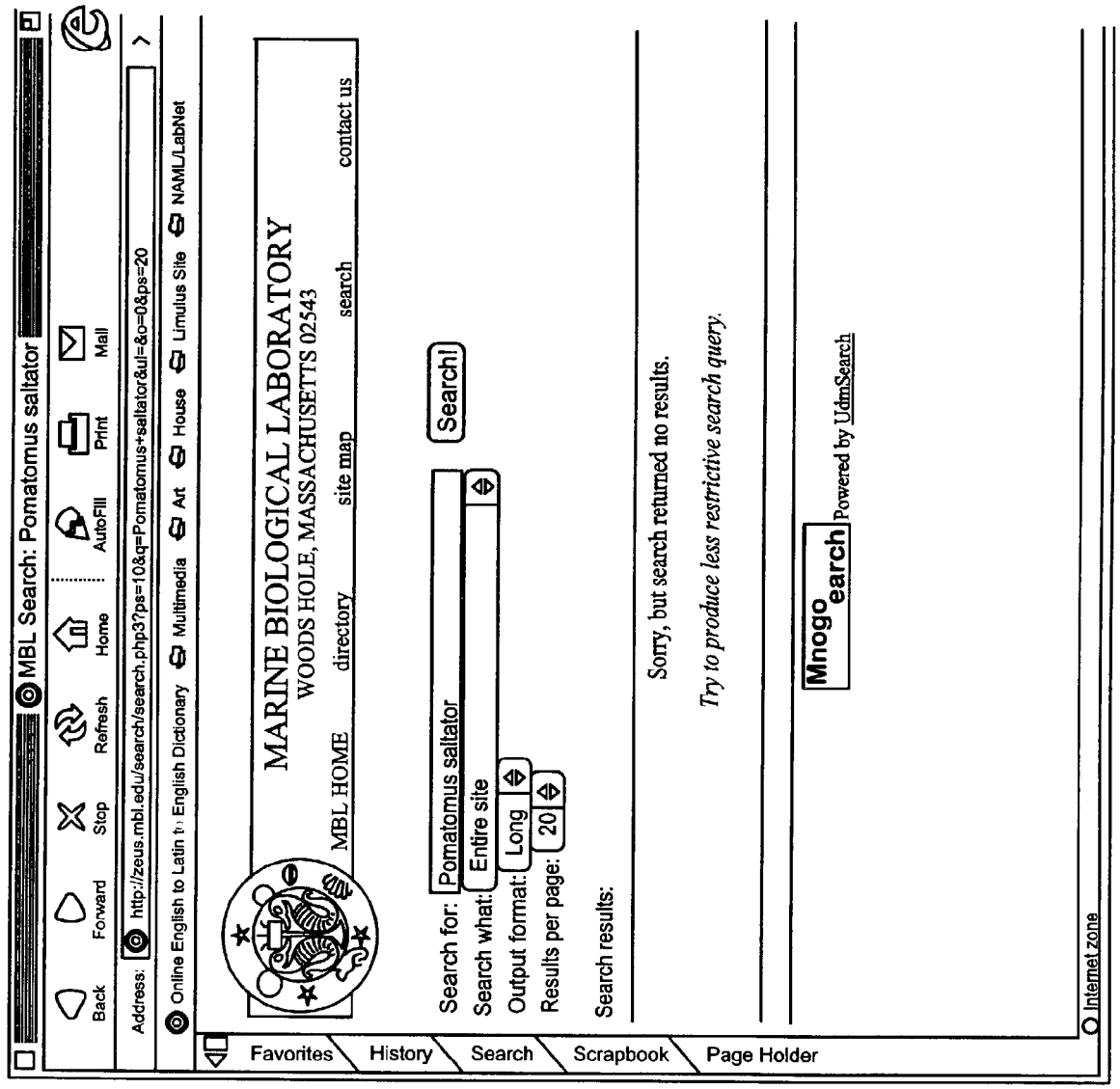
Figure 27:
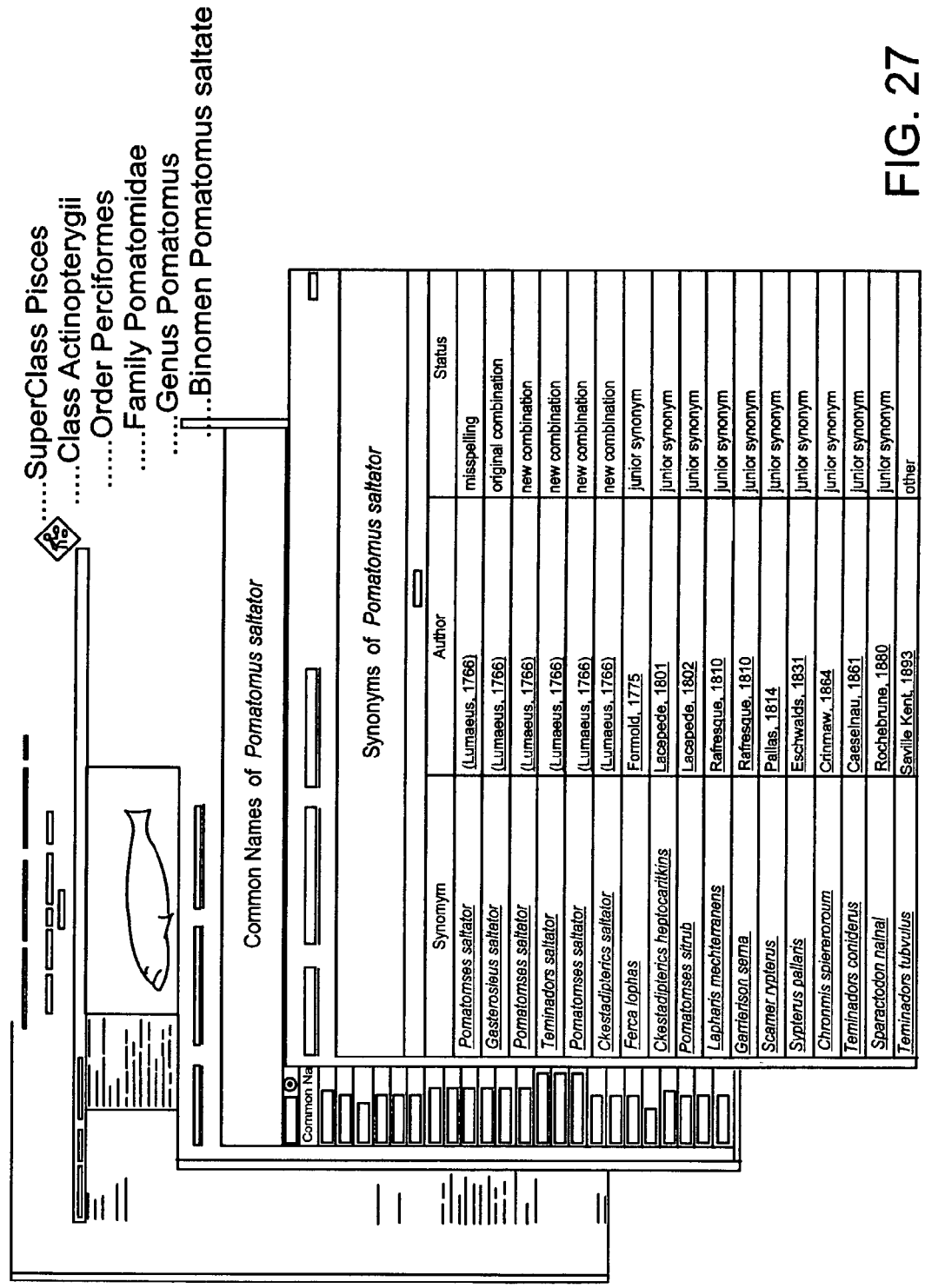
Figure 28:
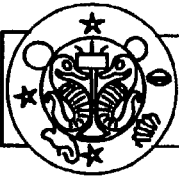
Figure 29:
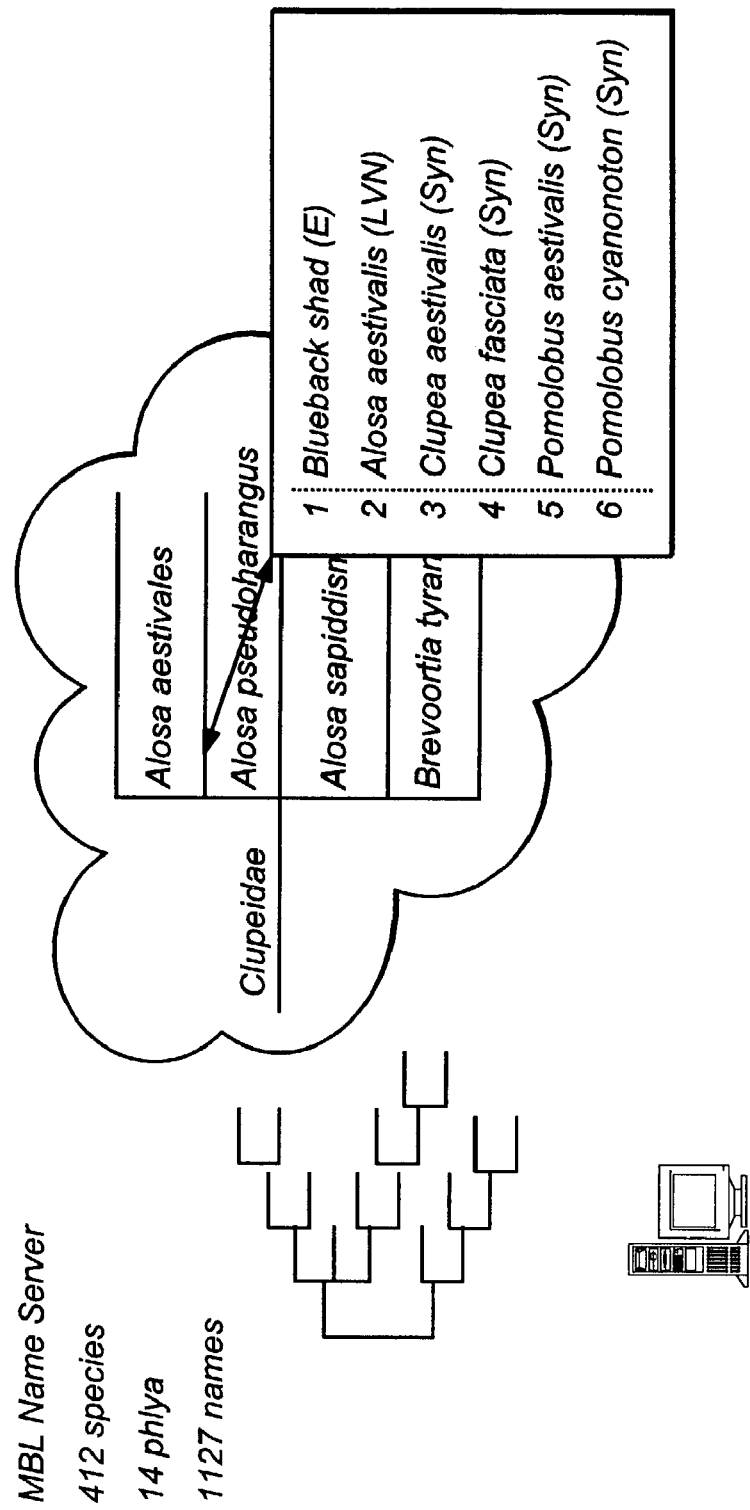

An example is described below in which information is sought about the bluefish. Initially, the name used for the search is Pomatomus saltator (FIG. 24), which turns up no results (FIG. 25). It is determined that Pomatomus saltatrix is a synonym (FIG. 26), and classification information is determined (FIG. 27). Results are found by searching on synonym Pomatomus saltatrix (FIG. 28). The TIS allows, for each species within a particular Web site, a search to be executed for all names on a list of names to search from a thesaurus, with a single interface and syntax to retrieve the results regardless of the taxa (so that, for example, a search for fish information can be executed in the same way as a search for bird information) (FIG. 29). For each species within the particular Web site, a means is provided as described below to link the name to a URL, and a classification tree is provided to browse through links to the URLs (FIG. 30).

In the representative implementation, the Name Server system is configured to be distributed among multiple computers, particularly to facilitate maintenance of the data involved. Name servers can be set up and reside with taxonomic data managers. Management client software can be customized to serve the needs of the data manager while contributing to the larger maintenance of the entire system. The use of multiple name servers also spreads out the computing load of executing the service.

In some embodiments, each name server has an essentially complete representation ("mirror") of the name space being used. The name space is divided into a portion the name server is authorized to change and the remainder that is similarly hosted locally but is supplied from other computers that have corresponding authorizations pertaining to the remainder.

The management of the distribution and mirroring and other significant management issues is handled by a single (or, in some cases, dual) name server having the kernel. In the representative implementation, the kernel is implemented as an additional piece of program code that keeps track of the components of the current Name Server layer, and uses conventional network and database services to perform this function.

The representative implementation relies on the use of client software to access the services of the Taxonomic Name Server. The client software has at least three client layers that serve as entry interfaces to the name server at different organization levels: the domain layer, the application layer, and the data layer. In the representative implementation, the domain layer employs the services of TNS to index and manage taxonomic links to multiple applications, the application layer uses TNS to index and manage information representing one or more files or database records within an application, and the data layer embeds TNS reference information within a single file.

Two uses of the representative implementation can be described as name resolution services and context based narrowing or broadening. For example, with respect to name resolution services, a developer may have a database that contains information about an organism and records the species name of the organism. In such a case, the developer may use the name server to link the species to its representative TNS taxon, which allows a user to locate the database entry by reference to any of the organism's known names in the Name Server. As another example, a full-text journal service may have a database of articles to which a user is directing a search for articles pertaining to a certain organism or group of organisms. With name resolution services, the user may type in only one name but the search is made comprehensive for all of the organism's known names in the Name Server. The comprehensiveness is achieved by locating the taxon represented by the organism and causing the search software to perform an aggregate search for all of the names associated with the taxon (and thus with the organism).

With context-based narrowing or broadening, in an example, a user using a comprehensive name search, described above, may search for instances of disease in a specific type of bird, without useful results. In such a case, the search engine may allow the user to perform the same search with the bird's immediate relatives (e.g., within the same genus) as the subject, and if unsatisfactory results persist, the search can be broadened further. Classification information provides the basis for broadening or narrowing the search, and the ability to store multiple different classifications provides multiple contexts for the broadening or narrowing.

Types of relationships that are considered between taxa include the following: a broader relationship ("RB"), a narrower relationship ("RN"), a relationship other than synonymous, narrower, or broader ("RO"), an "alike" relationship ("RL"), a parent relationship in a Name Server classification ("PAR"), a child relationship in a Name Server classification ("CHD"), and a sibling relationship in a Name Server classification ("SIB"). In addition, an allowed qualifier ("AQ") may be supplied relating to the original taxon searched upon.

The representative implementation can be commonly used as described in the examples below. In the first example, a user searches for all names for a particular organism using a Web client to TNS. In the second example, a developer seeks to link the developer's database of organisms to TNS services. The third example concerns context-based searching and browsing.

In the first example, a user has a name or a list of names to look up using the Taxonomic Name Server, and would like to obtain information identifying all other names that are representative of the corresponding taxa and specifying how each of the organisms is currently classified. The user types the name or names into a Web form having a line for each name. The names are submitted to TNS via HTTP. A program receives the form from the user and iterates through each line. Each line is formed into a SQL query to the TNS kernel. The query is executed against the names table. For each line, the objective is to match the user-supplied name with a single taxon within TNS and to build a list of taxon identifiers.

If there is a single match, the taxon identifier is appended to the list of taxon identifiers. If there is more than one match, in some embodiments the user is presented with the multiple matching taxa and is relied upon to determine which one matches the intended usage of the name. The list is complete when all of the provided names are matched to taxon identifiers or have been discarded because a match was not found.

Each taxon identifier is then used in a query to the Names table. All matching names are returned with reference and other table elements. Their ultimate output is determined by the user; for example, they may form part of a new database and may be output to a computer screen.

Each taxon is used to query the classification tables within TNS. Unless the user specifies a different classification, the default classification for the taxon is returned. The classification is determined via a corresponding classification procedure that follows the hierarchical structure of the data model back to the root taxon of the specified classification. The result is an array of taxa representing the ancestry of the taxon within the classification. The user determines how to output this information but typically it is presented to the screen or terminal.

In the second example, a developer wishes to embed the features of the Taxonomic Name Service within the developer's own application, which provides the developer with a dynamic system of taxonomy. Names added to the TNS become automatically available to the user.

A user has a database containing taxonomic information (names). The names are represented in a column of a table of the database and are part of the data model. A TNS client application (Web-based or local) sends each name in the list over a network interface to a TNS server where the corresponding taxon identifier is matched and returned to the application. The user or client application creates a new column (or table) in the database in which each row contains the respective corresponding taxon identifier that matches the name contained in the database. Since the name is part of the data model, the taxon identifier can now be used within the data model as well. With the taxon identifier from TNS now linked to the data model, the name and classification functions of TNS are available to the database.

In the building of a custom classification tree within the database, the list of taxon identifiers is passed to TNS and one or more classifications are selected. TNS builds a larger list of all taxa required to represent the classification of the list and returns the larger list to the user or client as a SQL table declaration. Thus, a small version of the TNS classification table is built specifically for the database, with the following structure:

classification_ID|taxon1_ID|relationship_attribute|taxon2_ID| classification_ID

The small version of the table provides the data structure needed to provide a navigable classification structure within the database. The user or client can allow TNS to dynamically resolve name information for all of the listed taxa via the network interface or can download the current matching set of names locally for faster name resolution. In the latter case, the downloaded set results in an additional names table being included in the user database and containing the following elements:

Name_ID|taxon_ID|Name_Type|Name_Reference

When a user types in a name to search within the database, the following SQL query is sent either to TNS or to the local version of the names table:

SELECT * from names where STRING IN (SELECT taxon_ID from taxon_table)

The third example is directed to contextual browsing and searching. As noted above, classifications reflect relationships between taxa. In particular, typical traditional biological classifications are represented as hierarchies of taxa. The hierarchies can be used in search strategies to broaden or narrow an inquiry into an aspect of a node in the hierarchy. TNS can represent multiple different hierarchical arrangements of taxa and thus provide many options for searching.

In the example, a fish farmer user is looking for publications on diseases of a type of salmon known as the sockeye. The user logs into a large bibliographic database and enters a search term such as "sockeye salmon AND disease". A typical conventional search algorithm would split this string into the terms "sockeye salmon" and "disease" and perform a boolean AND search using the two literal strings, returning results where the two strings intersect. This approach can be unsatisfactory, since searching only for the string "sockeye salmon" ignores any information that includes any other string that might represent the taxon for the "sockeye salmon" organism.

A TNS-enhanced search engine performs the same boolean split and search and matches the string "sockeye salmon" to a taxon identifier:

Select taxon_ID where name like 'sockeye salmon'

The taxon identifier is then used to retrieve all other names known to match the taxon:

SELECT names where taxon_ID=F234

The TNS returns the list of all known names:
Sockeye
salmon
Oncorhynchus nerka
Hypsifario kennerlyi
Oncorhynchus nerka kennerlyi
Salmo kennerlyi
Salmo nerka
Salmo paucidens The search can now be modified to include all of the known names:

Disease AND (Sockeye salmon OR Oncorhynchus nerka OR Hypsifario kennerlyi OR Oncorhynchus nerka kennerlyi OR Salmo kennerlyi OR Salmo nerka OR Salmo paucidens)

The TNS classification context for the taxon can also provide enhancement. The ICZN classification for a sockeye salmon, for example, is as follows:

Osteichthyes
  Class Actinopterygii
    Order Salmoniformes
      Family Salmonidae
        subFamily Salmoninae
          Genus *Oncorhynchus*
            Binomen *Oncorhynchus nerka*

The classification's lineage is represented in a table that TNS generates based upon the classifications table. The generated table contains three columns: the name of the classification, the taxon identifier, and a text-delimited string of taxon identifiers representing the lineage of the taxon according to the particular classification:

CX1|F243|

/C1/P1/P2673/P2674/D1/D1537/D1543/D1547/
  D1555/F192005/F180046/F175424/F150

151/F102821/F243

If the search on the single taxon pertaining to sockeye salmon produces an unsatisfactory set of results, TNS can expand the search by ascending the classification tree one level and performing a search on all of the names of the corresponding taxa. For example, sockeye salmon belongs to the genus "Oncorhynchus" with a taxon identifier of F102821.

Performing a search on all taxa that are hierarchical children of the F102821 taxon is performed by following query:

Select taxon_ID from classifications where this_taxon
  like '%/F102821/%'

The results include all members of the genus:
*Oncorhynchus aguabonita* (F2686)
*Oncorhynchus apache* (F2687)
*Oncorhynchus chrysogaster* (F6208)
*Oncorhynchus clarki clarki* (F2688)
*Oncorhynchus clarki lewisi* (F26972)
*Oncorhynchus gilae* (F2689)
*Oncorhynchus gorbuscha* (F240)
*Oncorhynchus ishikawai* (F10438)
*Oncorhynchus iwame* (F10448)
*Oncorhynchus keta* (F241)
*Oncorhynchus kisutch* (F245)
*Oncorhynchus masou formosanum* (F16686)
*Oncorhynchus masou macrostomus* (F6547)
*Oncorhynchus masou masou* (F242)
*Oncorhynchus masou rhodurus* (F4731)
*Oncorhynchus mykiss* (F239)
*Oncorhynchus nerka* (F243)
*Oncorhynchus tshawytscha* (F244)

TNS can retrieve all the names for all of these taxa with the query:

Select names from names_table where taxon_ID IN (Select taxon_ID from classifications where this_taxon like '%/F102821/%')

The names can be combined with the boolean AND and the string "disease" to perform a more robust and more generalized search than the original search.

TNS can move upward or downward along the classification tree to refine, narrow, or broaden a search. Thus, a larger context can be placed upon a taxon and provide an enhanced mechanism for data discovery.

The following example helps to demonstrate how a specific implementation of the TNS handles text string submissions, particularly with respect to how a user provided name is matched to a taxon.

TNS has several protocols for receiving input from a user or client. The Web provides an HTTP interface but in at least some implementations TNS can receive data via other network connections, and the resolution of a query and the response is independent of the network interface. The following example typifies a name resolution query.

An example string, "Pomatomus saltator" is received via one of the network interfaces. The string represents a taxon. One or more additional qualifiers are provided to inform the Name Server how to process the string, e.g., indicating whether the user wants to confirm that the string represents a valid taxon, or whether the user wishes to know the current preferred string for the taxon.

As described briefly above, TNS stores string information in a Names table. The Names table matches strings to an associated taxon identifier. A sample row from the Names table illustrates the basic Names data model:

52580|F364|Pomatomus saltator|L|Linnaeus, 1766

A unique identifier is used for each name, and is followed by the taxon identifier. The third column stores the name string and is followed by a qualifier that describes the context of the string and, in the last column, by a reference to the name, as described briefly above.

In the specific implementation, the taxon identifier is generated by the Name Server system and has no intrinsic meaning.

The string "Pomatomus saltator" is searched for an accompanying match in the Names table. The search is accomplished with a query to the "Name" column:

SELECT myID from Names where Name like
  'Pomatomus saltator'

If one or more matches are found, the taxon identifiers are returned to the user or client. In the current example, only one taxon matches the string. In a case in which more than one is found, the user or client may be relied upon to identify which taxon was intended, and may proceed by requesting a more full classification of each taxon.

If a taxon is matched to a string, the user or client may request that all other strings matching this taxon be returned, by submitting a query to the Names table. The query is directed to the taxon column, labeled "myID", and the string to match is the taxon identifier returned in the response to the previous query, for example:

Select * from Names where myID like 'F364'

The results of the query include all names recorded for the taxon. Each row from the Names Table includes additional attributes about each string, such as the string's source language, literature references, and name qualifier codes that identify the string as either a vernacular name or a scientific name, as described above. For example, in the first line of the representative sample listed below, "Linnaeus, 1766" (i.e., author, date) serves as a bibliographic literature reference and "L" serves as a name qualifier code:

52580|F364|Pomatomus saltator|L|Linnaeus, 1766
66222|F364|Cheilodipterus heptacanthus|Syn|Lacepéde, 1801

66237|F364|Cheilodipterus saltatrix|Syn|Linnaeus, 1766
66750|F364|Chromis epicurorum|Syn|Gronow, 1854
73884|F364|Gasterosteus saltatrix|Syn|Linnaeus, 1766
75219|F364|Gonenion serra|Syn|Rafinesque, 1810
80501|F364|Lopharis mediterraneus|Syn|Rafinesque, 1810
87000|F364|Perca lophar|Syn|Forsskäl, 1775
89118|F364|Pomatomus pedica|Syn|Whitley, 1931
89119|F364|Pomatomus saltatrix|Syn|Linnaeus, 1766
89120|F364|Pomatomus skib|Syn|Lacepéde, 1802
93166|F364|Scomer sypterus|Syn|Pallas, 1814
94656|F364|Sparactodon nalnal|Syn|Rochebrune, 1880
96053|F364|Sypterus pallasii|Syn|Eichwald, 1831
96259|F364|Temnodon conidens|Syn|Castelnau, 1861
96261|F364|Temnodon saltator|Syn|Linnaeus, 1766
96262|F364|Temnodon tubulus|Syn|Saville-Kent, 1893

The Name Server can return a count of all the names found for a taxon, or only the scientific names, or only the names in a particular language, or any of many other variations on the results set based on the needs of the user or client. The user or client may also specify how the result set is formatted and returned. For example, the list may be returned as comma-separated values for importation into a spreadsheet. Alternatively, a client software library may request the list to be returned in a data structure such as an array.

In a specific implementation, TNS stores classifications as follows. As noted above, the taxonomic data that is stored can be organized into three major categories: names, taxa, and classifications. Strings represent the character sets that are known to have been associated with a defined taxon. In many or all cases, taxa are created by specialists in the fields of systematics and biology and each taxon itself is formally described in a publication. References to a taxon are made to the taxon's name, i.e., a text string. The string may be scientific nomenclature, with an accompanying literature reference, such as "Temnodon tubulus, (Saville-Kent, 1893)", or may be a more generic vernacular name such as "Tassergal", which refers to the same taxon. TNS attempts to match any known string to any known taxon. The main criterion for a name being associated with a taxon is a record documenting such usage.

In the specific implementation, classifications represent relationships among taxa. Classification assemblages can be large, e.g., representing all known biota. Generally, since classifications may be in contention both among experts and over time, classifications may be dynamic.

The TNS data model can represent different classifications of the same taxa. In a specific implementation, the data model does not identify any classification as being more valid than others and provides a framework to record all of the classifications and a means for a user or client to determine which of the classifications is appropriate for a particular use.

The classifications data model is based on several tables. A first table records a reference to a classification. The reference identifies the classification's author or proponents and provides a unique classification identifier, and if relevant, the taxon identifier for the taxon that represents the root of the classification. An example below represents a classification of cephalopods according to G. L. Voss. The classification has a classification identifier "CX2" and the root of the classification is identified by taxon identifier "D178", which represents the class Cephalopoda:

CX2|G. L. Voss Classification of Cephalopods|D178|0|Marion Nixon, J. B. Messenger, The Biology of Cephalopods, 1977, The Zoological Society of London, Academic Press. p. 575|Some cephalopod biologists prefer this classification which retains the Sepioidea.

The details of the classifications are stored in a classification table. Each row of the classification table includes the classification identifier, a taxon identifier, a relationship attribute, and a second taxon identifier. An example below illustrates that the taxon "Cep1015" has a child relationship with taxon "Voss03" according to the Voss classification of Cephalopods.

CX2|Cep1015|CHD|Voss03|CX2

Standard hierarchical classifications can thus be described in a single table as a large set of such pairs of taxa linked with a relationship attribute. The classification of the domestic dog, according to the Smithsonian classification of Mammals would therefore be represented by a set of parent attributes:
Mammalia (parent_of)
  Eutheria (parent_of)
    Carnivora (parent_of)
      Canidae (parent_of)
        *Canis (parent_*of)
          *lupus (parent_*of)
            *familiaris*

The relationship attribute qualifies the relationship between the two taxa. Many classifications are hierarchical relationships that can be described with parent/child relationships. TNS provides additional qualifiers that can be useful for resolving relationships between different classifications. For example, the taxon "Sepioidea" used in the Sweeney classification of Cephalopods does not exist in the G. L. Voss classification of Cephalopods. Sweeney joined the two taxonomic orders, "Spirilida" and "Sepiida," to create Sepioidea. Joining or splitting of taxa is common among differing classifications. TNS uses the relationship attributes "RB" (Relationship Broader) and "RN" (Relationship Narrower) to describe two of the relationships between different classifications. Thus Sepioidea, according to Sweeney, is a broader taxon than Sepiida, according to Voss.

CX1|Voss03|RB|Cep1102|CX2

These and other relationship attributes provide flexibility in describing relationships between differing taxonomic views and also allow for different views of the meaning of any particular species. Characterizations of a species and identifications of the strings that represent the species may differ among scholars and other users. TNS treats such differences as small, separate classifications that can be qualified in a similar manner as described above.

In at least some embodiments, TNS relies on XML extensions to full text documents and other non-tabular data to allow searches to make use of TNS capabilities. Conventionally, text strings are the sets of characters typically used to record information. For biological information, names are the strings that represent a pertinent taxon. Over time, new names often supercede the older names yet still refer to the same taxon, which can present a problem for data organization and which is addressed by the TNS. A labor-intensive approach to the superceding name situation involves replacing an outdated name with the currently accepted form in each document that is to subject to being searched. In at least some cases, this approach is unsatisfactory because it requires making qualitative changes to the source data and provides no assurance that the new preferred form will not be superceded in turn.

XML provides the means to define a data structure that can link an arbitrary name string in a document to its associated taxon without having to remove the source data. The linking is performed by placing a start and end tag around the string to define the string as relating to a taxon, for example:

<TAXON>Pomatomus saltator</TAXON>

An attribute to the tag stores the taxon identifier so that the name functions of the Name Server are available for application to the tag.

<TAXON ID=F18976>Pomatomus saltator</TAXON>

Other optional attributes may specify a classification identifier for the tagged string so that the document can be placed within a classification context.

Another possible element in the XML data definition is a tag that links the document to a name server for name and classification functions. The tag includes the address of a name server, as shown in the following example:

<PARSER type=Taxonomic_name_server addr=tns.mbl.edu:1234>

The technique (including one or more of the procedures described above) may be implemented in hardware or software, or a combination of both. In at least some cases, it is advantageous if the technique is implemented in computer programs executing on one or more programmable computers, such as a general purpose computer, a networked computer, and/or a computer running or able to run Microsoft Windows 95, 98, 2000, Millennium Edition, NT, XP; Unix; Linux (or another variant of Unix); or MacOS; that each include a processor such as a RISC processor and/or an Intel Pentium 4, a storage medium readable by the processor (including volatile and non-volatile memory and/or storage elements), at least one input device such as a keyboard, and at least one output device. Program code is applied to data entered using the input device or received from another source to perform the method described above and to generate output information. The output information is applied to one or more output devices such as a display screen of the computer, or to another application or computer.

In at least some cases, it is advantageous if each program is implemented in a high level procedural or object-oriented programming language such as C, C++, Java, PHP, or Perl to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, palmtop or other highly portable computers may be used, possibly networked using wireless communications. Voice recognition software may be used to allow voice input or queries. Text to voice software may be used to allow voice output. One or more non-relational databases may be used. Genetic input may be manually or automatically input and/or used. New classifications may be automatically or manually created based on existing or proposed classifications.

What is claimed is:

1. A computerized method for managing taxonomic information to facilitate retrieval of information, wherein information includes at least one of the following another name for an organism, a classification for an organism, taxonomic data for an organism, and/or other data related to an organism, comprising:

identifying a first name that specifies an organism;
determining if the first name corresponds to a name entry in a names table;
identifying a first taxonomic identifier of the name entry;
determining if the first taxonomic identifier is included in a classification entry in a classification table allowing taxa to be organized according to more than one classification, wherein each entry in the classification table associates the first taxonomic identifier with a classification identifier, a relationship attribute, and a second taxonomic identifier, and wherein the classification table is included in a database of classifications configured to accommodate alternative classifications and help determine a classification for the organism, wherein the database of classifications includes a reference table in which each entry associates a classification identifier with a taxon that represents the root of the classification;
identifying the second taxonomic identifier of the classification entry; and
based on the second taxonomic identifier, identifying a second name;
retrieving the information based on at least the first and/or second name.

2. The method of claim 1, further comprising: based on the first name and the second name, deriving a search parameter.

3. The method of claim 1, wherein the first name is a scientific name and the second name is a common name.

4. The method of claim 1, wherein the first name and the second name are scientific names and wherein the second name is a variant of the first name.

5. A computerized system for managing taxonomic information to facilitate retrieval of information, wherein information includes at least one of the following anther name for an organism, a classification for an organism, taxonomic data for an organism, and/or other data related to an organism, comprising: a processor configured to operate on:

a name identifier component configured to identify a first name that specifies an organism,
a determiner component configured to determine if the first name corresponds to a name entry in a names table;
an identifier component configured to identify a first taxonomic ID of the name entry;
another determiner component configured to determine if the first taxonomic ID is included in a classification entry in a classification table, wherein each entry in the classification table associates the first taxonomic ID with a classification identifier, a relationship attribute, and a second taxonomic ID, and wherein the classification table is included in a database of classifications configured to accommodate alternative classifications and help determine a classification for the organism, wherein the database of classifications includes a reference table in which each entry associates a classification identifier with a taxon that represents the root of the classification;

a second identifier component configured to identify the second taxonomic ID of the classification entry; and a third identifier component configured to identify, based on the second taxonomic ID, a second name;

wherein said processor is configured to retrieve information based on at least said first name or said second name.

6. Computer software, residing on a computer-readable storage medium, comprising a set of instructions for use in a computer system to help cause the computer system to manage taxonomic information to facilitate retrieval of information, wherein information includes at least one of the following another name for an organism, a classification for an organism, taxonomic data for an organism, and/or other data related to an organism, the set of instructions for causing the computer system to:

identify a first name that specifies an organism;

determine if the first name corresponds to a name entry in a names table;

identify a first taxonomic ID of the name entry;

determine that the first taxonomic ID is included in a classification entry in a classification table, wherein each entry in the classification table associates the first taxonomic ID with a classification identifier, a relationship attribute, and a second taxonomic ID, and wherein the classification table is included in a database of classifications configured to accommodate alternative classifications and help determine a classification for the organism, wherein the database of classifications includes a reference table in which each entry associates a classification identifier with a taxon that represents the root of the classification;

identify the second taxonomic ID of the classification entry; and identify, based on the second taxonomic ID, a second name;

retrieving the information based on at least the first and/or second name.

7. A system for managing taxonomic information to facilitate retrieval of information, wherein information includes at least one of the following another name for an organism, a classification for an organism, taxonomic data for an organism, and/or other data related to an organism, comprising: a processor configured to operate on a names table in which each entry associates a character string with a name identifier;

a taxon table in which each entry associates a name identifier with a taxon identifier;

a database of classifications that accommodates alternative classifications, the database including:

a reference table in which each entry associates a classification identifier with a taxon that represents the root of the classification; and a classification table in which each entry associates a taxon identifier with a classification identifier, a relationship attribute, and a second taxon identifier;

a name identifier configured to identify a name that specifies an organism from the names table;

a determiner configured to use the name and the database of classifications to help determine a classification for the organism; and an identifier configured to use the classification to help identify information associated with the organism;

wherein the processor is further configured to retrieve the information based on at least the name.

8. The system of claim 7, wherein the name is a polynomen.

9. The system of claim 7, wherein the name is a modern name.

10. The system of claim 7, wherein the name is a trinomen.

11. The system of claim 7, wherein the name is a scientific name.

12. The system of claim 7, the name is a non-scientific name.

13. A computerized method for managing taxonomic information to facilitate retrieval of information, wherein information includes at least one of the following another name for an organism, a classification for an organism, taxonomic data for an organism, and/or other data related to an organism, comprising:

providing a database including:

a names table in which each entry associates a character string with a name identifier;

a taxon table in which each entry associates a name identifier with a taxon identifier; and a database of classifications that accommodates alternative classifications, the database including:

a reference table in which each entry associates a classification identifier with a taxon that represents the root of the classification; and a classification table in which each entry associates a taxon identifier with a classification identifier, a relationship attribute, and a second taxon identifier;

identifying a name that specifies an organism from the names table;

based on the name and the database of classifications, determining a classification for the organism; and retrieving information based on at least the name.

14. The method of claim 13, wherein the method further comprises:

based on the classification, identifying information associated with the organism.

15. The method of claim 13, wherein the name is a polynomen.

16. The method of claim 13, wherein the name is a modern name.

17. The method of claim 13, wherein the name is a trinomen.

18. The method of claim 13, wherein the name is a scientific name.

19. The method of claim 13, the name is a non-scientific name.

20. The method of claim 13, further comprising:
receiving a request for information including the name; and
based on the request, selecting a database access layer to receive the request.

21. The method of claim 13, further comprising:
receiving a request for information including the name; and
directing the request to an application layer for serving client functions.

22. The method of claim 13, further comprising:
receiving a request for information including the name; and
directing the request to a data layer to determine a unique identifier associated with the organism.

23. The method of claim 13, further comprising:
identifying a textual description associated with the organism.

24. The method of claim 13, further comprising:
identifying an illustration associated with the organism.

25. The method of claim 13, further comprising:
identifying a multimedia data object associated with the organism.

26. The method of claim 13, further comprising:
identifying a data pointer associated with the organism.

27. The method of claim 13, further comprising:
basing the identification of the information on a defined domain of information.

28. The method of claim 13, further comprising:
determining a biological classification for the organism.

29. The method of claim 13, further comprising:
determining a geographical classification for the organism.

30. The method of claim 13, further comprising:
determining a non-biological classification for the organism.

31. The method of claim 30, further comprising
identifying information associated with another organism that belongs to the classification.

32. A computerized method for managing taxonomic information to facilitate retrieval of information, wherein information includes at least one of the following another name for an organism, a classification for an organism, taxonomic data for an organism, and/or other data related to an organism, comprising:

identifying a first name that specifies an organism;

associating a first taxon with the first name;

determining that the first taxon is included in a classification entry in a classification database, the classification database allowing taxa to be organized according to more than one classification wherein each entry in the classification database associates the first taxon with a classification identifier, a relationship attribute, and a second taxon, and wherein classifications database is configured to accommodate alternative classifications and help determine a classification for the organism, wherein the database of classifications includes a reference table in which each entry associates a classification identifier with a taxon that represents the root of the classification; and associating the second taxon with the classification entry;

retrieving the information based on at least the name.

* * * * *